(12) United States Patent
Sakai et al.

(10) Patent No.: US 8,769,069 B2
(45) Date of Patent: Jul. 1, 2014

(54) DATA COLLECTION APPARATUS AND METHOD THEREOF

(75) Inventors: Kazuyuki Sakai, Kawasaki (JP); Yasushi Kobayashi, Kawasaki (JP); Yuuki Tada, Kawasaki (JP); Tomoyuki Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 180 days.

(21) Appl. No.: 12/892,396

(22) Filed: Sep. 28, 2010

(65) Prior Publication Data

US 2011/0078298 A1 Mar. 31, 2011

(30) Foreign Application Priority Data

Sep. 30, 2009 (JP) ................................ 2009-228839

(51) Int. Cl.
*H04L 29/06* (2006.01)
(52) U.S. Cl.
USPC ......................................... 709/223; 714/47.1
(58) Field of Classification Search
USPC .................. 709/223, 224; 714/47.1
See application file for complete search history.

(56) References Cited

U.S. PATENT DOCUMENTS

| | | | | |
|---|---|---|---|---|
| 6,327,677 | B1 * | 12/2001 | Garg et al. ...................... | 714/37 |
| 7,233,957 | B1 * | 6/2007 | Sheehy et al. .................... | 1/1 |
| 7,421,490 | B2 * | 9/2008 | Bharati et al. ................. | 709/224 |
| 7,653,725 | B2 * | 1/2010 | Yahiro et al. .................. | 709/224 |
| 7,657,545 | B2 * | 2/2010 | Bird .............................. | 705/7.37 |
| 7,739,082 | B2 * | 6/2010 | Scherrer ........................... | 703/2 |
| 2002/0198985 | A1 * | 12/2002 | Fraenkel et al. .............. | 709/224 |
| 2007/0038896 | A1 * | 2/2007 | Champlin et al. .............. | 714/38 |
| 2008/0228907 | A1 * | 9/2008 | Iizuka et al. ................... | 709/223 |
| 2009/0193298 | A1 * | 7/2009 | Mukherjee ...................... | 714/38 |
| 2010/0162350 | A1 * | 6/2010 | Jeong et al. ....................... | 726/1 |

FOREIGN PATENT DOCUMENTS

| | | |
|---|---|---|
| JP | 02-277114 | 11/1990 |
| JP | 2007-241426 | 9/2007 |
| JP | 2007-257244 | 10/2007 |

OTHER PUBLICATIONS

Japanese Office Action for corresponding Japanese Application No. 2009-228839; dated Jul. 23, 2013.

* cited by examiner

*Primary Examiner* — Carolyn B Kosowski
*Assistant Examiner* — Jason C Chiang
(74) *Attorney, Agent, or Firm* — Staas & Halsey LLP

(57) ABSTRACT

A data collection apparatus includes an information storing unit which stores application information collected from a server providing a service by running an application and includes detail information indicating a detail of the application, an information collecting unit which collects the application information from the server, an information identifying unit which identifies application information in which an abnormality has occurred and application information, affected by the abnormality, a first comparing unit which compares, as to the application information identified by the information identifying unit, all application information including the detail information and all application information including the detail information collected in the previous point, and extracts application information different from the application information collected in a previous point, and an information sending unit which sends the application information, extracted by the first comparing unit, to a data management apparatus which manages the application information.

9 Claims, 24 Drawing Sheets

FIG. 3

| APPLICATION NAME | INSTANCE INFORMATION | UPDATED DATE |
|---|---|---|
| Web1 | ID、Status… | 2009/8/7 |
| Web2 | ID、Status… | 2009/6/6 |
| Appl1 | ID、Status… | 2009/7/20 |
| Appl2 | ID、Status… | 2009/8/20 |
| DB1 | ID、Status… | 2008/12/30 |
| … | … | … |

FIG. 4

| SERVICE APPLICATION | APPLICATION |
|---|---|
| SERVICE A | Web1 |
| | Appl1 |
| | DB1 |

FIG. 5

| SERVICE APPLICATION | APPLICATION |
|---|---|
| SERVICE B | Web2 |
| | Appl1 |
| | DB2 |

FIG. 6

| SERVICE APPLICATION | APPLICATION |
|---|---|
| SERVICE C | Web2 |
| | Appl3 |
| | DB2 |

FIG. 10

| SERVICE APPLICATION | STATUS | AVERAGE RESPONSE TIME | RESPONSE TIME THRESHOLD VALUE |
|---|---|---|---|
| SERVICE A | Down | 0.3 | 0.5 |
| SERVICE B | Active | 0.2 | 0.5 |
| SERVICE C | Active | 0.2 | 0.5 |

FIG. 11

| INSTANCE | Id | CHANGE COUNTER |
|---|---|---|
| INS_m1_10000 | DE_m1_10003 | 3 |
| | DE_m1_10000 | 2 |
| | DE_m1_10001 | 1 |
| | DE_m1_10002 | 1 |
| ... | ... | ... |

FIG. 17

INS_m1_10000ACTDE_m1_10003INADE_m1_10000ACTDE_m1_10001ACTDE_m1_1002ACTPROC_m1_1000ACTPROC_m1_1001ACTPROC_m1_1002ACT_m1_1002ACTACT

FIG. 18

INS_m1_10000ACTDE_m1_10003ACTDE_m1_10004ACTDE_m1_10005ACTDE_m1_10000ACTDE_m1_10001ACTDE_m1_10002ACTDE_m1_10002ACTPROC_m1_1000ACTPROC_m1_1001ACTPROC_m1_1002ACT

DATA COLLECTION APPARATUS AND METHOD THEREOF

CROSS-REFERENCE TO RELATED APPLICATIONS

This application is based upon and claims the benefit of priority of the prior Japanese Patent Application No. 2009-228839, filed on Sep. 30, 2009, the entire contents of which are incorporated herein by reference.

BACKGROUND

1. Field

Various embodiments described herein in detail relate to a data collection apparatus and method thereof.

2. Description of the Related Art

IT systems that provide clients with a variety of information technology (IT) services have become widely used. For example, use of a web server, an application server, a data base server, storage or the like in combination allows the IT systems to provide a variety of IT services coupled with recent widespread use of high-speed communication technologies and high-speed communication lines. In the above-discussed IT systems, data collection apparatuses that collect application information from respective servers have also been used for the purpose of detecting failures at earlier stages, managing applications running on the respective servers, or performing other processing.

Hereinafter, such an IT system that includes the data collection apparatus will be discussed in detail. More specifically, as illustrated in FIG. 24, the IT system includes a monitoring target server group, a data collection apparatus, and a data management apparatus. The monitoring target server group is made up of servers each of which provides the clients with the IT services. As the monitoring target server group, there may be mentioned, for example, the web server, the application server, the database server, the storage or the like.

The data collection apparatus collects the application information, for example, processes making up applications, deployed applications running on the applications or the like, from each of the monitoring target servers. Next, the data collection apparatus sends the collected instance information, to the data management apparatus. The data management apparatus is a server apparatus that includes a configuration management database. The data management apparatus may store instance information received from the data collection apparatus in an integrated fashion and manage each piece of the application information by associating the respective pieces of the application information with each other.

In the above-discussed IT system, the data collection apparatus collects the application information periodically, for example, in an interval of one (1) minute, from the monitoring target servers, and the collected application information is stored in the data management apparatus. Administrators or the like may detect the failures by making analysis of the application information stored in the data management apparatus and manage application information and/or applications having been added and/or deleted.

However, a certain amount of time is consumed by the data collection apparatus for collecting the application information and storing the collected application information in the data management apparatus in cases of large scale IT systems that include a large number of monitoring target servers. Making an interval for application information collection shorter to achieve the application information collection almost real-time results in a delay in data collection processing because it is difficult to complete the data collection processing during which the application information is collected and stored, until the next collection point.

For this reason, a data collection apparatus, for example, as discussed in Japanese Laid-Open Patent Application Hei 02-277114, has been used in recent years. The data collection apparatus discussed above compares application information having been collected in the past with the latest collected application information, and only the application information with a difference is stored in a data management apparatus. This technique may make it possible to reduce data collection/processing time.

However, the conventional technique discussed above results in an increase in load when comparing the application information in the cases of large scale IT systems that include a large number of monitoring target servers. Consequently, a delay is caused in the data collection processing during which the application information is collected and stored.

SUMMARY

According to an aspect of an embodiment, a data collection apparatus includes an information storing unit which stores application information collected from a server providing a service by running an application and includes detail information indicating a detail of the application, an information collecting unit which collects the application information from the server, an information identifying unit which identifies application information of an application in which an abnormality has occurred and application information, affected by the abnormality, from among the application information collected by the information collecting unit.

The apparatus includes a first comparing unit which compares, as to the application information identified by the information identifying unit, all information including the detail information with all information of the application information, including the detail information, collected in a previous point, and stored in the information storing unit, and extracts application information different from the application information collected in the previous point, a second comparing unit which compares, as to application information except the application information identified by the information identifying unit, information from which the detail information is excluded with information which is obtained by excluding the detail information from the application information, collected in the previous point and stored in the information storing unit, and extracts application information different from the application information collected in the previous point; and an information sending unit which sends the application information, extracted by one of the first comparing unit and the second comparing unit, to a data management apparatus which manages the application information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 illustrates an example of information stored in an application information database (DB);

FIG. 4 illustrates a table that indicates an example of configuration information of a Service A stored in a configuration information DB;

FIG. 5 illustrates a table that indicates an example of configuration information of a Service B stored in the configuration information DB;

FIG. 6 illustrates a table that indicates an example of configuration information of a Service C stored in a configuration information DB;

FIG. 10 illustrates a table that indicates an example of information stored in a service application DB;

FIG. 11 illustrates a table that indicates an example of information stored in an update frequency DB;

FIG. 17 illustrates a diagram that indicates an example of a string produced by converting the latest-collected instance information to the string;

FIG. 18 illustrates a diagram that indicates an example of a string produced by converting the previously-collected instance information to the string;

DETAILED DESCRIPTION

Figure 1:
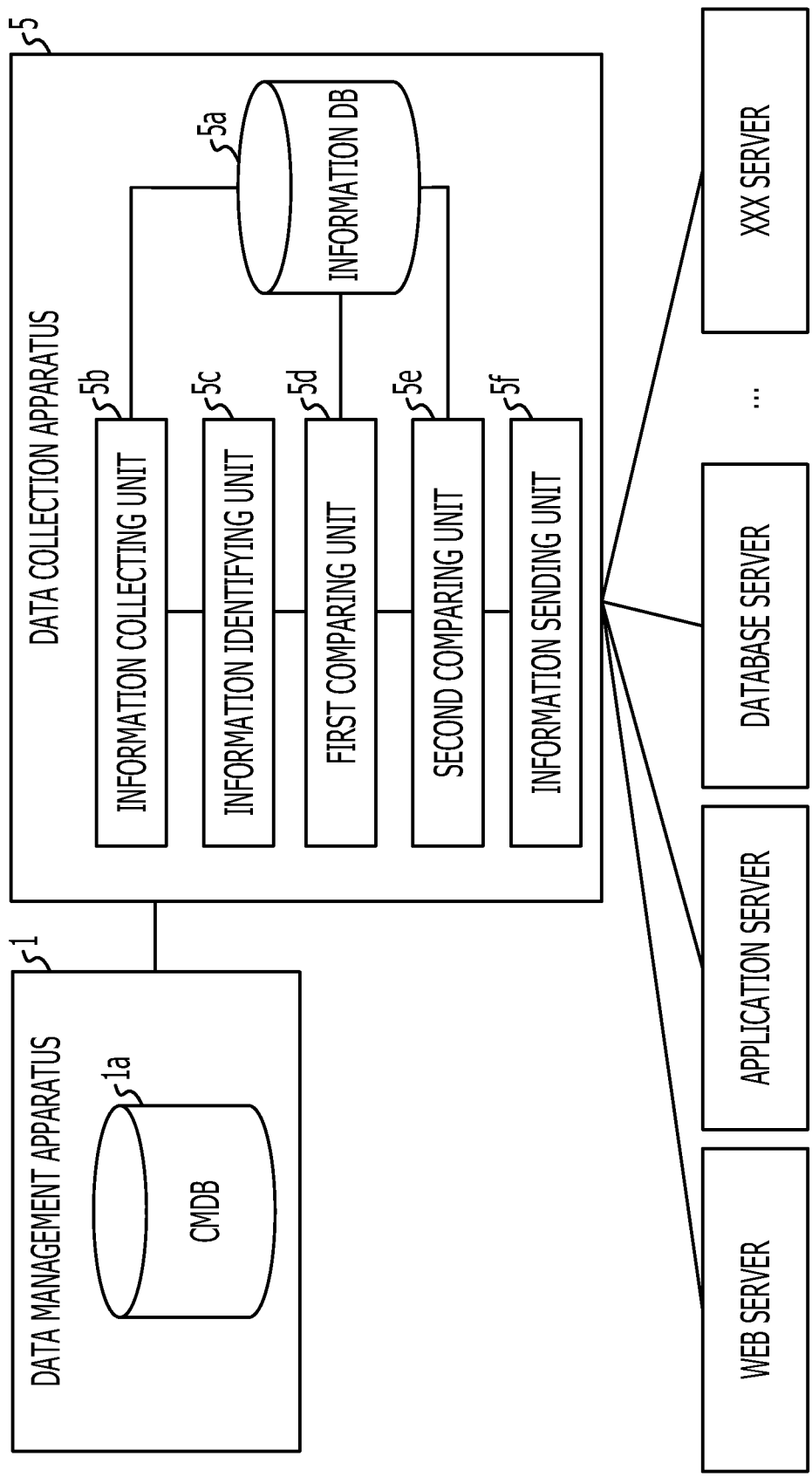
FIG. 1 illustrates a diagram that indicates a configuration of a system which includes a data collection apparatus according to an embodiment of the present application.

Reference will now be made in detail to the embodiments, examples of which are illustrated in the accompanying drawings, wherein like reference numerals refer to the like elements throughout. The embodiments are described below to explain the present invention by referring to the figures.

Hereinafter, embodiments of a data collection apparatus disclosed by the present application will be described in detail with reference to drawings. Note however that the scope and spirit of the present invention is not limited to these embodiments.

FIG. 1 illustrates a diagram that indicates a configuration of a system which includes a data collection apparatus disclosed according to an embodiment in the present application. As illustrated in FIG. 1, the system includes a variety of servers, such as, a web server, an application server, a database server or the like, data management apparatus 1, and a data collection apparatus 5.

The variety of servers, such as, the web server, the application server, and the database server or the like, is a server group that provides a client apparatus(es) with a variety of information technology (IT) services by associating applications, running on the respective servers, with each other. The web server, the application server, and the database server are mentioned here as examples. Note however that the servers are not limited to the ones disclosed above and the present invention may include various types of services that provide information and/or services.

The web server disclosed here is an apparatus that includes an information sending/receiving function with use of World Wide Web (WWW). More specifically, the web server holds HyperText Markup Language (HTML) documents, HTML images, and so on. When the web server receives a request, such as, a Hypertext Transfer Protocol (HTTP) request or the like, from a web browser of the client apparatus, the web server provides information corresponding to the received request.

The application server is an apparatus that includes a variety of functions, such as, a program execution environment, a connecting function to a database, transaction management or the like. The application server responds to the request from the client apparatus. More specifically, the application server serves as a bridge between the web server that processes the HTTP request from the client apparatus and the backend database server and performs data processing or the like.

The database server includes a database configured with, for example, a relational database management system (RDBMS). For example, the database server performs processing on the database in response to a data search request and/or a data update request from the client apparatus and responds the results thereof.

The data management apparatus 1 includes a configuration management database (CMDB) 1a that manages information of all the configuration item(s) configuring the system which provides the IT services, in an integrated fashion. The data management apparatus 1 stores information about applications (that is, application information) running on the variety of servers.

The data collection apparatus 5 is an apparatus that collects the application information from the variety of servers and sends the application information to the data management apparatus 1. The data collection apparatus 5 includes an information DB 5a, an information collecting unit 5b, an information identifying unit 5c, a first comparing unit 5d, a second comparing unit 5e, and an information sending unit 5f. The data collection apparatus 5 may collect any type of information from across a variety of servers not limited to servers illustrated in FIG. 1.

The information DB 5a stores the application information that is collected from the server apparatus(es) executing the application(s) to provide the service(s) and includes detail information indicating a detail(s) of the application(s).

For example, the information DB 5a stores application information that includes "start time" and "Uniform Resource Locator (URL) to be referenced" as the detail information, and "process name", "ID", and "status" as the information except the detail information. Note that the information indicated here is just an example and the present application is not limited thereto. For example, data stored in the information DB 5a may include various items concerned with executing an operation relative to application information from one or more of the servers.

The information collecting unit 5b collects the application information from the server apparatus. For example, the information collecting unit 5b collects the application information from the respective servers that provide the client apparatus(es), such as, the web server, the application server, the database server, or the like, with the variety of ITs. Next, the information collecting unit 5b outputs the collected application information to the information identifying unit 5c and stores the collected application information in the information DB 5a.

The information identifying unit 5c identifies application information of an application(s) in which an abnormality(ies) has occurred and application information of an application(s) that is affected by the abnormality(ies), from among the pieces of application information collected by the information collecting unit 5b. The information identifying unit 5c disclosed above identifies the application information of the application(s) in which the abnormality(ies) has occurred based on pieces of information, for example, failure information input by administrators or the like, failure information acquired by a monitoring tool(s) or the like, and the configuration information of the application(s) held by the data management apparatus 1. Furthermore, the information identifying unit 5c identifies the application information of the application(s) affected by the abnormality(ies). Next, the information identifying unit 5c sends the identified application information of the application(s) in which the abnormality(ies) has occurred and the identified application information of the application(s) affected by the abnormality(ies), to the first comparing unit 5d. Note that, in so doing, the information identifying unit 5c sends application information of the application(s) that has not been identified, in other words, the application information of the application(s) with no relationship with the abnormality(ies), to the second comparing unit 5e.

With respect to the application information identified by the information identifying unit 5c, the first comparing unit 5d compares all the information including the detail information with all the information of application information, including the detail information, having been collected in the previous point, and stored in the information DB 5a. Next, as a result of the comparison, the first comparing unit 5d extracts application information in which there is a difference and sends the extracted application information, to the information sending unit 5f.

With respect to application information except the application information identified by the information identifying unit 5c, the second comparing unit 5e compares information from which the detail information is excluded with information which is obtained by excluding the detail information from the application information, collected in the previous point and stored in the information DB 5a. Next, as a result of the comparison, the second comparing unit 5e extracts the application information in which there is a difference and sends the extracted application information, to the information sending unit 5f.

The information sending unit 5f sends the application information detected by the first comparing unit 5d or the second comparing unit 5e, to the data management apparatus 1. That is to say, the information sending unit 5f sends the application information, received from the first comparing unit 5d or the second comparing unit 5e and different from the previously-collected application, to the data management apparatus 1.

Consequently, the data collection apparatus 5 of the system according to an embodiment identifies the information for which the comparison of the detail information is necessary and the information for which the comparison down to the detail information is unnecessary when the application information is collected. Next, the data collection apparatus 5 executes each of the two (2) pieces of comparing processing, that is, the comparing processing that includes the detail information and the comparing processing that does not include the detail information, and detects the application information different from the application information collected in the previous point, from the collected application information. Thus, the data collection apparatus 5 may achieve fast comparing processing of all the collected applications as compared with the case where the comparison down to the detail information is performed. As a result thereof, the fast comparing processing of the application information is achieved in the data collection processing, so that occurrence of a processing delay may be effectively reduced, if not prevented.

By the way, the respective apparatuses in the system disclosed in the above-described embodiment may include a variety of processing units other than the processing units described herein. For this reason, another embodiment that discloses another configuration in which the data management apparatus and the data collection apparatus, disclosed in the above-described embodiment, each include a variety of other processing units is described herein. Note that another embodiment discloses an example in which instance information is used as an example of the application information. The instance information is information that includes a process(es) making up an application(s) actually running on a server, for example, a web server or the like, that is an application information collection target, and information that includes information associated with a deployed application(s) running on the application(s).

Figure 2:
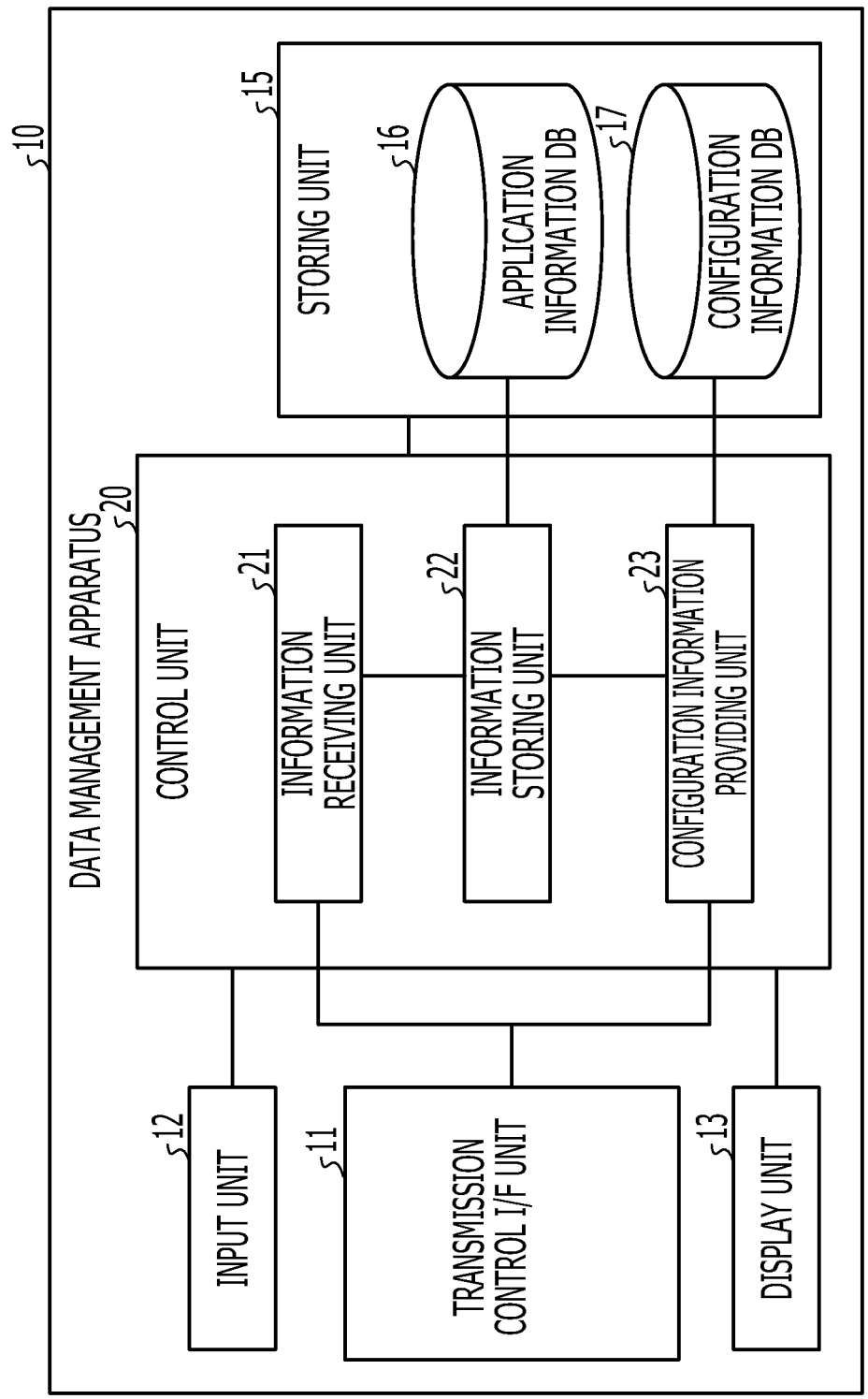
FIG. 2 illustrates a block diagram that indicates a configuration of a data management apparatus according to an embodiment.

First, a configuration of a data management apparatus according to an embodiment will be disclosed with reference to FIG. 2. FIG. 2 illustrates a block diagram that indicates a configuration of the data management apparatus according to an embodiment. As illustrated in FIG. 2, the data management apparatus 10 includes a transmission control I/F unit 11, an input unit 12, a display unit 13, a storing unit 15, and a control unit 20.

The transmission control I/F unit 11 is an interface that includes at least one (1) transmission port and controls information sent/received between the other apparatus(es). For example, the transmission control I/F unit 11 receives information from a data collection apparatus 50 and outputs a variety of information stored in the storing unit 15 or the like to a management apparatus in response to a request from the management apparatus (not illustrated).

The input unit 12 is, for example, a keyboard, a mouse, a microphone or the like. The input unit 12 receives an input of information, such as, a transmission instruction, a transmission destination or the like of the instance information, and inputs them to the control unit 20 or the like disclosed later. Note that the display unit 13 disclosed later achieves a pointing device function in conjunction with the mouse.

The display unit 13 is, for example, a monitor, a display, a touch panel, a speaker, and so on. The display unit 13 displays and/or outputs the application information, configuration information stored in the storing unit 15 or the like, the instance information received from the data collection apparatus 50, and the other information.

The storing unit 15 is a semiconductor memory device or a storage device, such as, a hard disk or the like, which includes an application information DB 16 and a configuration information DB 17. The storing unit 15 stores data and programs used for a variety of processing by the control unit 20.

The application information DB 16 associates the instance information collected from the data collection apparatus 50 with the applications running on respective servers to store. For example, the application information DB 16 stores "Web 1", "ID, Status . . . ", and "2009/08/07" as "application name", and "instance information", and "updated date" as illustrated in FIG. 3. Note that FIG. 3 is an example of information stored in the application information DB.

Information referring to "application name" stored is a name of an application(s) actually running on the variety of servers. The "application name" corresponds to applications disclosed later in FIGS. 4 through 6. In addition, "instance information" is information that the includes process(es) making up the application(s) actually running on the server that is the application information collection target, and information that includes information associated with the deployed application(s) running on the application(s). Information referring to "updated date" indicates a date at which "instance information" is updated based on the instance information received from the data collection apparatus 50. Note that the information indicated here is just an example and the present application is not limited thereto.

The configuration information DB 17 stores configuration information that indicates the following: What types of applications make up service applications running on the respective servers and how these applications are associated with each other? For example, as illustrated in FIG. 4, the configuration information DB 17 stores "Service A", "Web 1", "Appl 1", "DB 1" or the like, as "service application" and "application." Moreover, as illustrated in FIG. 5, the configuration information DB 17 stores "Service B", "Web 2", "Appl 1", and "DB 2" or the like, as "service application" and "application." In addition, as illustrated in FIG. 6, the configuration information DB 17 stores "Service C", "Web 2", "Appl 3", and "DB 2" or the like, as "service application" and "application." Note that FIG. 4 is a table that indicates an example of configuration information of the Service A stored in the configuration DB. FIG. 5 is a table that indicates an example of configuration information of the Service B stored in the configuration DB. FIG. 6 is a table that indicates an example of configuration information of the Service C stored in the configuration DB. While specific association of service application to an application is illustrated in FIGS. 4, 5 and 6, the present invention is not limited thereto. For example, any application may be used by any of multiple services and vice versa.

Information referring to "service application" stored here indicates a service(s) provided for a client apparatus(es) based on the association of the applications running on respective servers. Furthermore, "application" indicates an application(s) making up "service application" and corresponds to the application names illustrated in FIG. 3. In the example illustrated in FIG. 4 disclosed above, it is indicated that associating the applications "Web 1", "Appl 1", and "DB 1" allows the service application "Service A" to be provided for the client apparatus(es).

Figure 7:
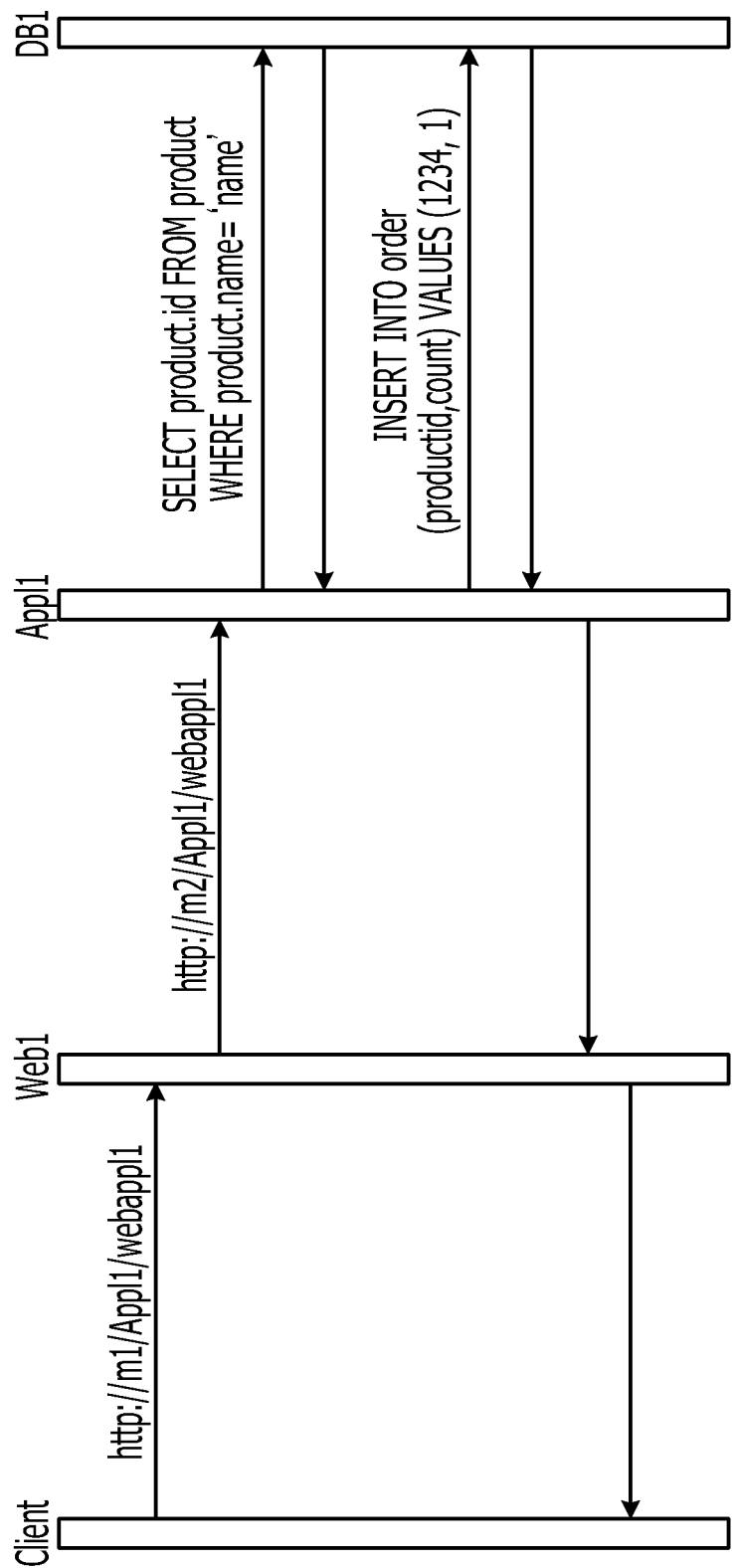
FIG. 7 illustrates a diagram that explains association of applications.

With reference to FIG. 7, a detailed description thereof will be further disclosed. FIG. 7 illustrates a diagram that explains the applications associating with each other. As illustrated in FIG. 7, the client apparatus accesses a URL (<http://m1/Appl1/webappl1>) provided by the Web 1 that is an application running on the web server based on a user's operation. The Web 1 having received the request sends the received access to the application Appl 1 running on an application server that is the target of association. Next, the Appl 1 executes an SQL "SELECT product.id FROM product WHERE product.name ='name'" which indicates, for example, that "acquiring a product id of a product record whose product name is name, from the product records" on the DB 1. In addition, the Appl 1 executes an SQL "INSERT INTO order (productid, count) VALUES (1234, 1)" which indicates, for example, that "inserting (productid, count)= (1234, 1) into an order record" on the DB 1. Subsequent thereto, the Appl 1 sends execution results of each of the SQLs to the Web 1, and the Web 1 sends the execution results, having received from the Appl 1, as a response, to the client apparatus(es). Consequently, associating the applications Web 1, Appl 1, and DB 1 with each other allows the service applications to be provided for the client apparatus(es).

The control unit 20 is, for example, electronic circuit, such as, a central processing unit (CPU), a micro processing unit (MPU) or the like. The control unit 20 includes an internal memory that stores control programs, such as, an operating system (OS) or the like, programs defining a variety of processing procedures or the like, and data that is used. Furthermore, the control unit 20 includes an information receiving unit 21, an information storing unit 22, and a configuration information providing unit 23. The control unit 20 causes these units to execute a variety of processing.

The information receiving unit 21 receives the instance information from the data collection apparatus 50. For example, information receiving unit 21 receives instance information, which has undergone changes, such as update, deletion or the like among the instance information of the application(s) running on respective servers, from the data collection apparatus 50 and outputs the changed instance information to information storing unit 22 disclosed later.

The information storing unit 22 stores the instance information received by the information receiving unit 21 in the application information DB 16. For example, the information storing unit 22 updates the instance information received by the information receiving unit 21 and stored in the application information DB 16. Next, in response to the update of the instance information, the information storing unit 22 stores the date when the instance information is updated, in "updated date" corresponding to the updated instance information.

The configuration information providing unit 23 sends the configuration information to the data collection apparatus 50 upon receipt of a configuration information acquisition request from the data collection 50. For example, the configuration information providing unit 23 identifies the application based on the information, such as, the application name, the ID or the like included in the acquisition request upon receipt of the configuration information acquisition request from the data collection apparatus 50. Next, the configuration information providing unit 23 acquires the configuration information related to the identified application, from the configuration information DB 17 and sends the acquired configuration information to the data collection apparatus 50 that is a request source.

Figure 8:
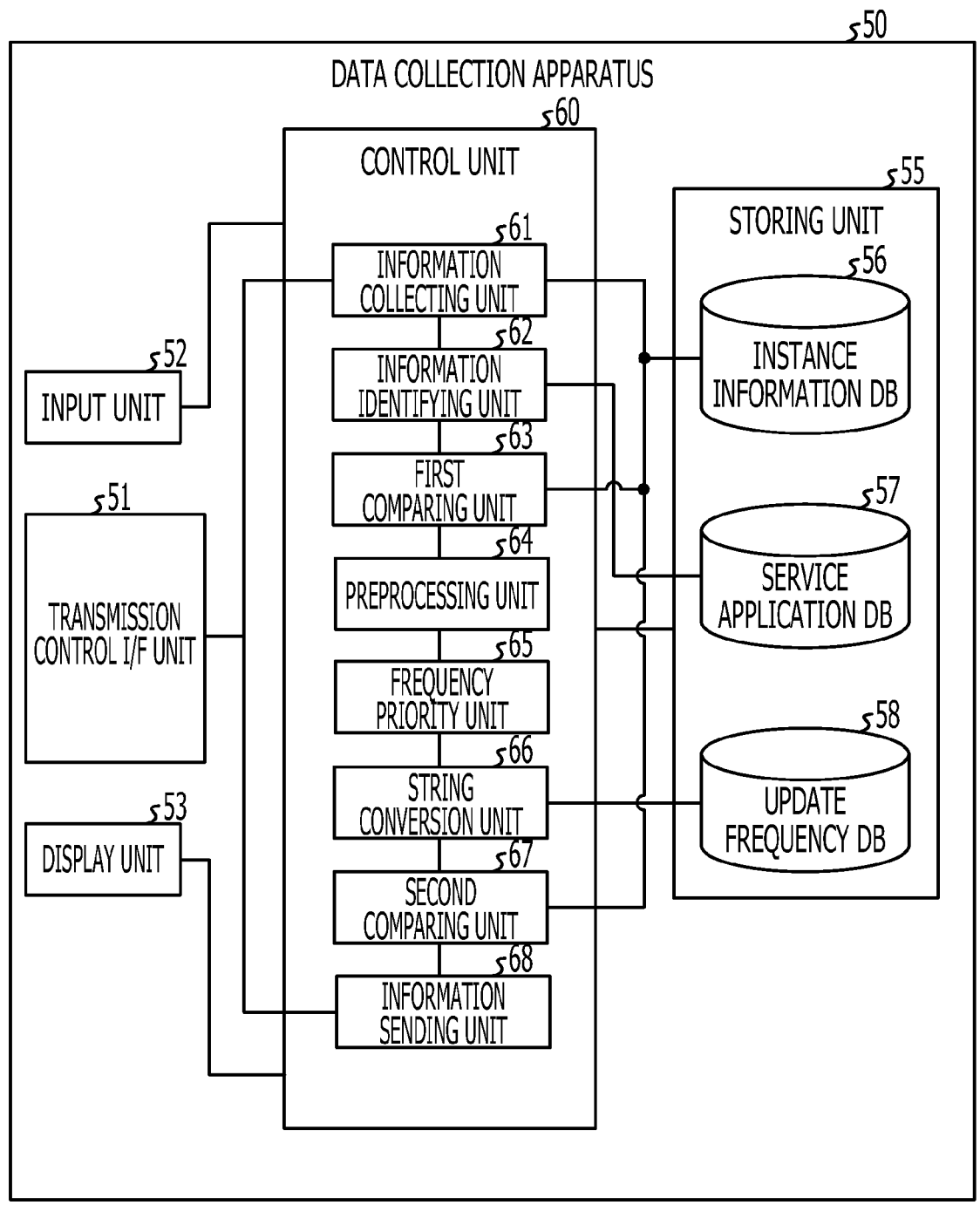
FIG. 8 illustrates a block diagram that indicates a configuration of a data collection apparatus according to an embodiment.

Next, with reference to FIG. 8, a configuration of the data collection apparatus according to an embodiment will be disclosed. FIG. 8 illustrates a block diagram that indicates the configuration of the data collection apparatus according to an embodiment. As illustrated in FIG. 8, the data collection apparatus 50 includes a transmission control I/F unit 51, an input unit 52, a display unit 53, a storing unit 55, and a control unit 60.

The transmission control I/F unit 51 is an interface that includes at least one (1) transmission port and controls information sent/received between the other apparatus(es). For example, the transmission control I/F unit 51 receives the instance information from the respective servers and sends the instance information to the data management apparatus 10.

An input unit 52 is, for example, a keyboard, a mouse, a microphone or the like. The input unit 52 receives an input of information, such as, a collection start instruction, a collection completion instruction or the like of the instance information and input the above information to the control unit 60 disclosed later. Note that the display unit 53 disclosed later achieves the pointing device function in conjunction with the mouse.

The display unit 53 is, for example, a monitor, a display, a touch panel, a speaker or the like. The display unit 53 outputs the instance information stored in the storing unit 55 or the like, the instance information collected by the control unit 60 or the like, and a result or the like on which comparing processing by the control unit 60 is performed. Furthermore, the display unit 53 may also display the instance information collected by the control unit 60 and the instance information stored in the storing unit 55.

The storing unit 55 is a storage device, such as a hard disc, which includes an instance-information DB 56, a service application DB 57, and an update frequency DB 58. The storing unit 55 stores, for example, data and programs to be used for a variety of processing performed by the control unit 60.

Figure 9:
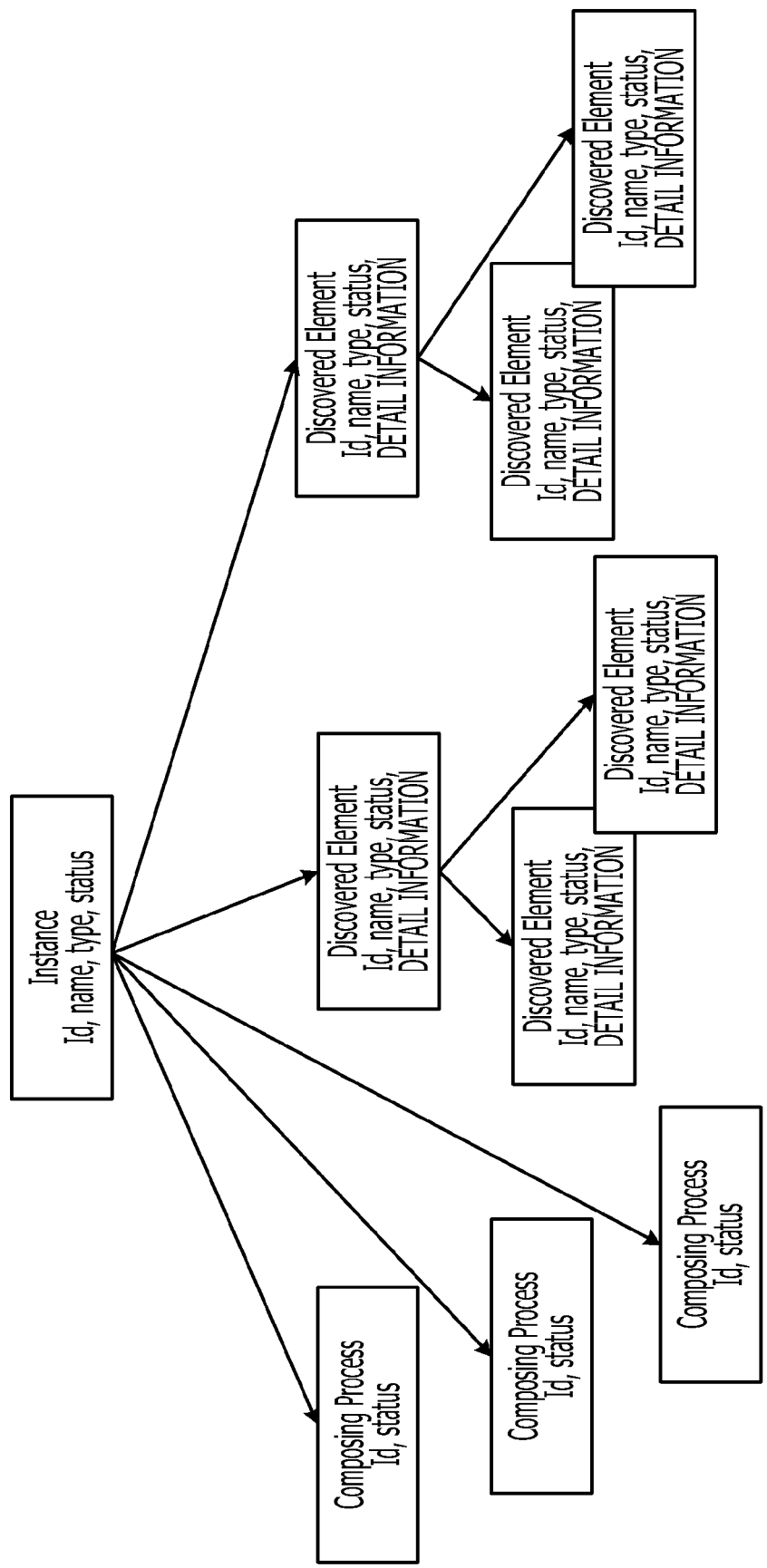
FIG. 9 is a diagram that indicates an example of information stored in an instance-information DB.

The instance-information DB 56 stores the instance information collected from each server by an information collecting unit 61 of the control unit 60 disclosed later. For example, as illustrated in FIG. 9, the instance-information DB 56 stores instances each of which includes any one of "Composing process" having "ID" and "status" and "Discovered Element" having "Id", "name", "type", "status", and "detail information." Moreover, the instance-information DB 56 may only store previously-collected instance information or may store the information corresponding to a certain time period. Note that FIG. 9 illustrates a diagram that indicates an example of information stored in the instance-information DB.

Information referring to "Composing Process" stored here indicates the instance information of a process(es) running on the OS of the server and is the instance information an update frequency of which is less frequent. Information referring to "Discovered Element" indicates the instance information of an executed deployed application(s), such as, software and/or middleware of the server and is the instance information an update frequency of which is more frequent. "Id" included in "Composing Process" and "Discovered Element" is an identifier that uniquely identifies the process or the deployed application. In addition, "status" is information that indicates a status of the process or the deployed application. Information referring to "status" becomes "active" when, for example, the process or the deployed application is normal and "status" becomes "inactive" when the process or the deployed application is abnormal.

Moreover, as illustrated in FIG. 9, the instance information forms a hierarchical structure. Consequently, a relationship between an output source of an arrowed line and an output destination of the arrowed line forms a so-called parent-child relationship. More specifically, the instance information illustrated in FIG. 9 forms a hierarchical structure in which "Instance" is the highest-level parent with five (5) children, that is, two (2) pieces of "Discovered Element" and three (3) pieces of "Composing Process." Each of the two (2) pieces of "Discovered Element" further has two (2) pieces of "Discovered Element" as its children.

Information referring to "name" included in the above disclosed "Discovered Element" indicates a name of the deployed application. "type" indicates types of the collection target servers, such as, an "Application Server" or the like and types of the deployed applications, such as a "java container", a "webmodule", a "workunit" or the like. Furthermore, "detail information" is information, such as, "starttime" that indicates the start time of the deployed application, "resptime" that indicates a period of response between the request reception and the response, "weburl" that indicates a URL to be referenced upon receipt of the access, and so on. Note that the detail information disclosed above is just an example and the present application is not limited thereto. It is also possible that information specific to the applications, that is, the information which changes depending on the running application is stored.

The service application DB 57 stores a status of the service application(s) provided by the server(s). For example, as illustrated in FIG. 10, the service application DB 57 stores "Service A", "Down", "0.3", and "0.5", "Service B", "Active", "0.2", and "0.5", "Service C", "Active", "0.2", "0.5" or the like, as "service application", "status", "average response time", and "response time threshold value." The information stored here may be entered by administrators and so on or may be acquired from a monitoring tool and so on that monitors applications or services widely used in IT systems or the like. Note that FIG. 10 illustrates a table that indicates an example of information stored in the service application DB.

Information referring to "service application" stored here indicates a name of the service application provided for the client apparatus(es). Information referring to "status" indicates a status of the service application. For example, when the service application is in a normal status, "status" becomes "Active", when the service application is in a stopped status due to an abnormality, "status" becomes "Down", and when the service application is intentionally in an stopped status, "status" becomes "Inactive." Information referring to "average response time" is an average value of a period between a request reception from the client apparatus and a response thereto and "response time threshold value" is a threshold value for determining whether or not the average response time is abnormal. A user may arbitrarily specify a value of "response time threshold value." In the example disclosed above, since "status" of "Service A" is "Down", it is determined that "Service A" is in an abnormal status.

The update frequency DB 58 stores an update frequency that indicates the number of times the application information has been updated in the past. For example, as illustrated in FIG. 11, the update frequency DB 58 stores "INS_m1__10000, DE_m1__10003, 3", "INS_m1__10000, DE_m1__10000, 2" or the like, as "Instance", "Id", and "Change counter." Note that FIG. 11 illustrates a table that indicates is an example of information stored in the update frequency DB.

Information referring to "instance" stored here indicates the highest level instance information among the instance information forming the hierarchical structure and, for example, "Id" of the highest level "Instance" in FIG. 9. In addition, "Id" is information that indicates an instance which is a "child" of the highest level "instance." For example, "Id" in "Discovered Element" and "Id" in "Composing Process" correspond thereto, in FIG. 9. "Change counter" indicates the number of updates.

The control unit 60 is, for example, an electronic circuit, such as, a CPU, an MPU or the like, that includes an internal memory for storing a control program(s), such as, an OS or the like, programs defining the variety of processing procedures or the like, and data that is used. Moreover, the control unit 60 includes an information collecting unit 61, an information identifying unit 62, a first comparing unit 63, a preprocessing unit 64, a frequency priority unit 65, a string conversion unit 66, a second comparing unit 67, and an information sending unit 68, and a variety of processing is performed by these units.

The information collecting unit 61 executes the application to collect the instance information from the respective servers that provide the client(s) with the service application(s). More specifically, the information collecting unit 61 accesses each of the servers to collect the instance information of the application running on each of the servers upon reaching a collection point specified by the administrators or the like. Next, the information collecting unit 61 outputs the collected instance information to the information identifying unit 62 or the preprocessing unit 64 and stores the collected instance information in the instance-information DB 56. Note that any point in time may be specified as the collection point, for example, a point in time where the collection start instruction is received by the input unit 52, a specific point in time where a certain period, such as, once every other hour or the like, has elapsed, and so on.

Figure 12:
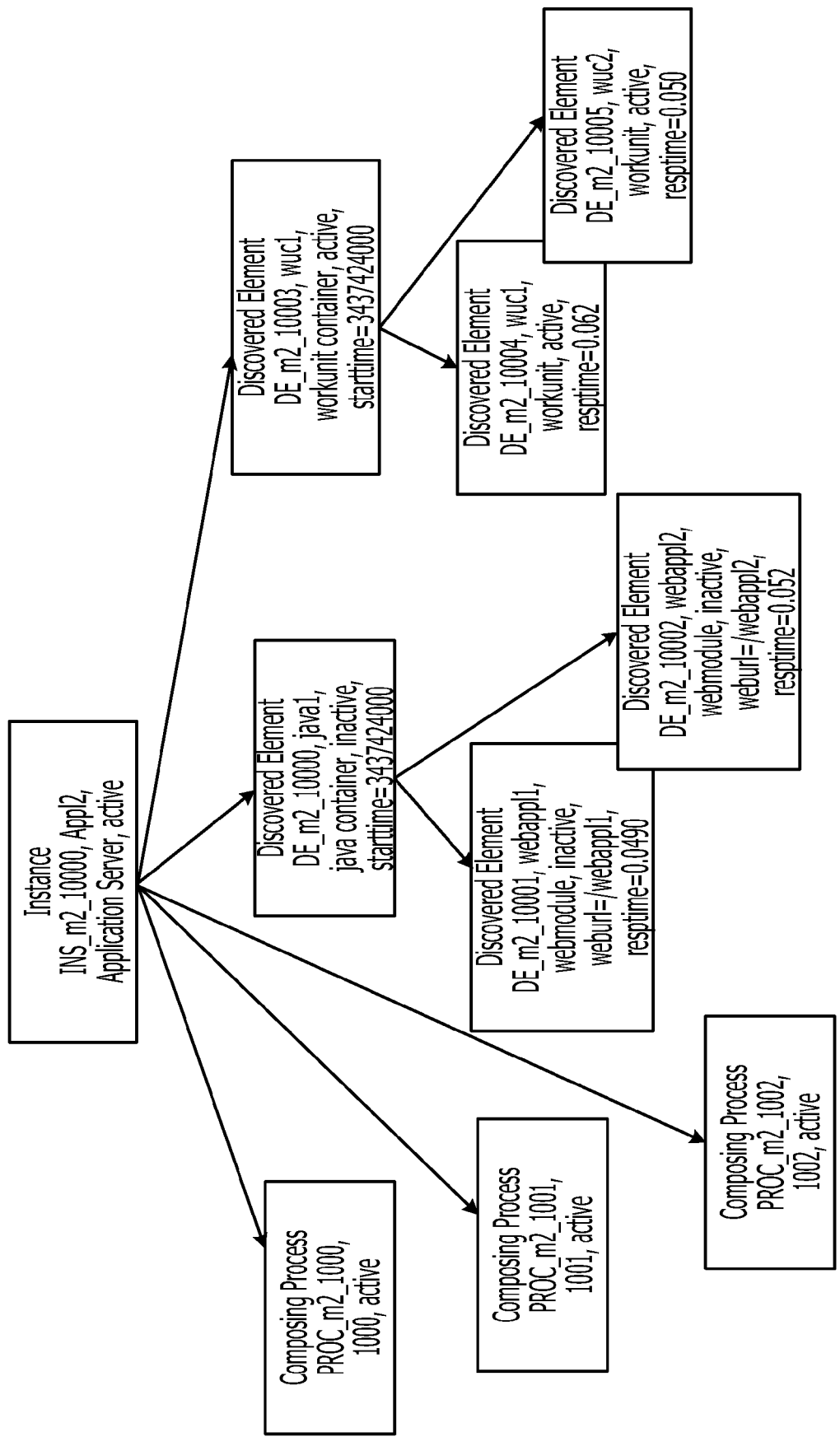
FIG. 12 illustrates a diagram that indicates an example of collected instance information.

For example, the information collecting unit 61 collects the instance information, in which the highest level instance is "Id=INS_m2_10000, name=Appl2, type=Application Server, status=active" as illustrated in FIG. 12, from the application server. The instance information illustrated in FIG. 12 has two (2) pieces of "Discovered Element" and three (3) pieces of "Composing Process" as the "child" of the above instance, and each of the two (2) pieces of "Discovered Element" further has two (2) pieces of "Discovered Element." FIG. 12 illustrates a diagram that indicates an example of the collected instance information.

The three (3) pieces of "ComposingProcess" are "Id=PROC_m2_1000, 1000, status=active", "Id=PROC_m2_1001, 1001, status=active", and "Id=PROC_m2_1002, 1002, status=active", respectively. In addition, the two (2) pieces of "Discovered Element" are "Id=DE_m2_10000, name=java1, type=java container, status=inactive, detail information (starttime=3437424000)" and "Id=DE_m2_10003, name=wuc1, type=workunit container, status=active, detail information, (starttime=3437424000)."

One of the instances that is the "child" of the instance "Id=DE_m2_10000" is "Discovered Element" indicated as "Id=DE_m2_10001, name=webappl1, type=webmodule, status=inactive, detail information (weburl=/webappl1, resptime=0.0490." The other instance is "Discovered Element" indicated as "Id=DE_m2_10002, name=webappl2, type=webmodule, status=inactive, detail information (weburl=/webappl2, resptime=0.052."

In addition, one of the instances that is the "child" of the instance "Id=DE_m2_10003" is "Discovered Element" indicated as "Id=DE_m2_10004, name=wuc1, type=workunit, status=active, detail information (resptime=0.062)." The other instance is "Discovered Element" that is indicated as "Id=DE_m2_100054, name=wuc2, type=workunit, status=active, detail information (resptime=0.050)."

Moreover, "status" of "Discovered Element (Id=DE_m2_10000, name=java1, type=java container, status=inactive, detail information (starttime=3437424000))" is "inactive" in FIG. 12. Thus, "Discovered Element" is in the abnormal status, and the instance information, the "parent" instance information of which is "Discovered Element", also indicates the abnormal status. That is to say, "Discovered Element", in which "Id" is "DE_m2_10001", is in the abnormal status, and "Discovered Element", in which "Id" is "DE_m2_10002", is also in the abnormal status.

The information identifying unit 62 identifies instance information of an application(s) in which an abnormality(ies) has occurred and instance information of an application(s) affected by the abnormality(ies), from among the pieces of instance information collected by the information collecting unit 61.

More specifically, the information identifying unit 62 references the service application DB 57 to identify the service application(s) in which the abnormality(ies) has occurred, and acquires configuration information related to the identified service application, from the data management apparatus 10. Next, the information identifying unit 62 references the instance information of the application that is indicated by the configuration information acquired from the data management apparatus 10, and identifies the instance information, in which "status" indicates "inactive." Then, the information identifying unit 62 identifies the application having the instance information, in which "status" is "inactive", as an abnormal application that is in the abnormal state. Subsequent thereto, the information identifying unit 62 references the configuration information acquired from the data management apparatus 10 and identifies the service application that includes the identified abnormal application as its component.

Thereafter, the information identifying unit 62 identifies all the applications making up the identified service application as the applications that are affected by the abnormality(ies). Then, the information identifying unit 62 sends the instance information of the identified abnormal application and the instance information of the application(s) affected by the abnormality(ies), to the first comparing unit 63. In addition, the information identifying unit 62 sends instance information of a normal application(s) and instance information of application(s) that is not affected by the abnormality(ies), to the preprocessing unit 64.

Description based on FIG. 12 discloses that the information identifying unit 62 references the service application DB 57 illustrated in FIG. 10 and identifies "Service A", in which "status" is "Down", as the service application(s) in which the abnormality(ies) has occurred. Next, the information identifying unit 62 acquires the configuration information of the service application "Service A" illustrated in FIG. 4, the configuration information of the service application "Service B" illustrated in FIG. 5, and the configuration information of the service application "Service C" illustrated in FIG. 6, from the data management apparatus 10. Then, the information identifying unit 62 recognizes that the applications making up the abnormal service application "Service A" are "Web 1", "Appl 1", and "DB 1." Subsequent thereto, the information identifying unit 62 references the instance information of the applications, that is, "Web 1", "Appl 1", and "DB 1", acquired by the information identifying unit 61, and identifies based on the instance information of "Appl 1" that "Appl1" is a cause of the abnormality of "Service A." Here, the information identifying unit 62 identifies that the rest of the applications, that is, "Web 1" and "DB 1" making up "Service A", which also includes "Appl 1" as its component, are the ones affected by the abnormality.

Figure 13:
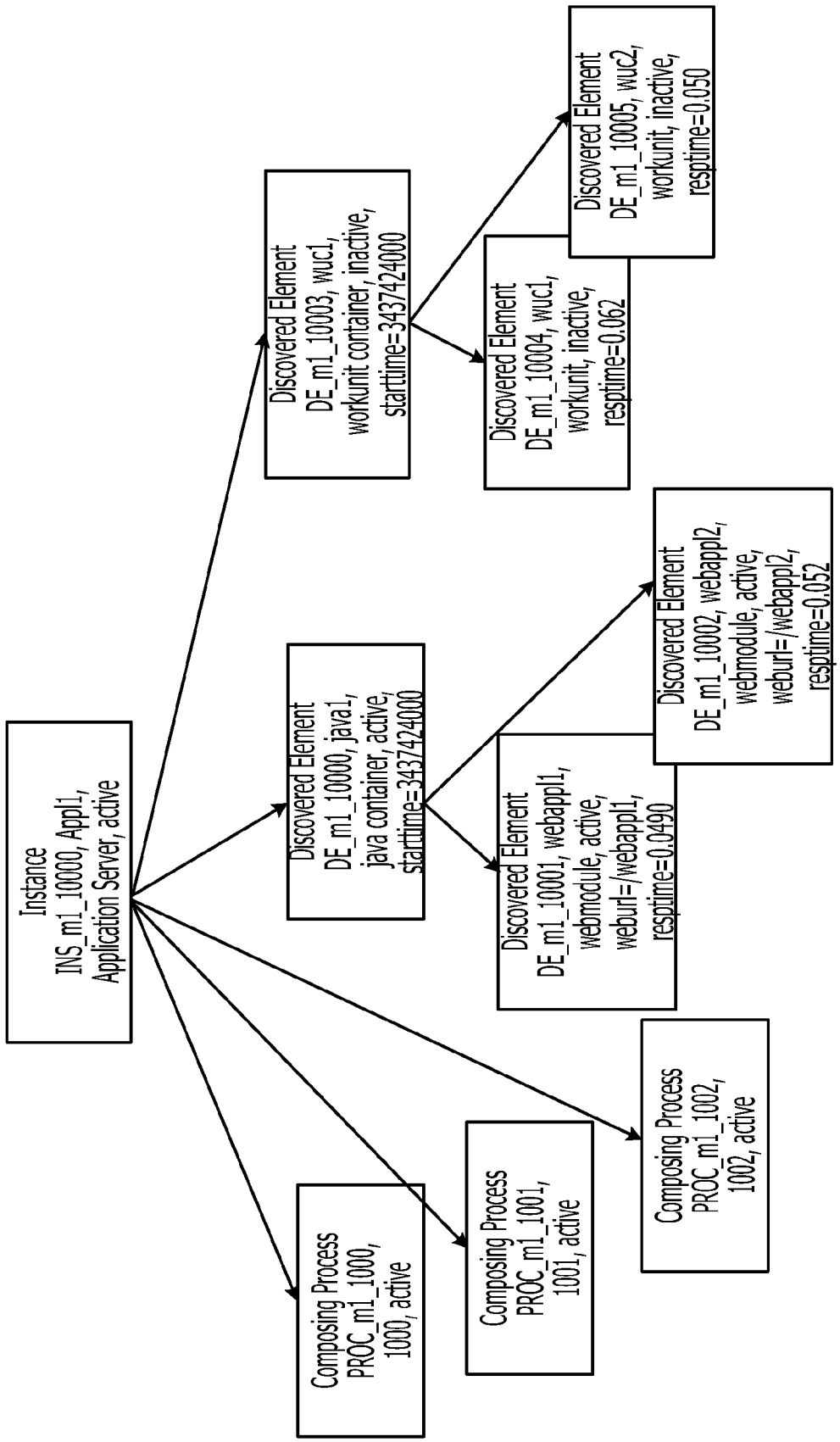
FIG. 13 illustrates a diagram that explains an example of identifying the instance information related to an occurrence of an abnormality(ies)

For example, assume that the instance information of the application "Appl 1" is the one illustrated in FIG. 13. In the above case, the information identifying unit 62 detects that "status" of "Discovered Element" of "Id=DE_m1__10003", "status" of "Discovered Element" of "Id=DE_m1__10004", and "status" of "Discovered Element" of "Id=DE_m1__10005", are "inactive." In consequence, the information identifying unit 62 identifies that the instance information of "Appl 1" collected by the information collecting unit 61 is the instance information of the application having caused the abnormality.

Next, the information identifying unit 62 identifies that "Service B" is the service application which includes, as its component, the application "Appl 1" that is identified as the cause of the abnormality, based on the configuration information of the previously-acquired "Service B" illustrated in FIG. 5 and "Service C" illustrated in FIG. 6. That is to say, it is possible to assume that "Service B" is affected by the abnormality because "Appl 1" in which the abnormality has occurred makes up "Service B" in conjunction with the other applications. In consequence, the information identifying unit 62 identifies "Web 2" and "DB2", which are the applications of "Service B" that also includes "Appl 1" as its component, as the applications affected by "Appl 1" in which the abnormality has occurred.

Then, the information identifying unit 62 sends the instance information of "Appl 1" identified as having caused the abnormality and the instance information of "Web 1", "DB 1", "Web 2", and "DB2" identified as being affected by the abnormality, to the first comparing unit 63. In addition, the information identifying unit 62 sends the instance information of the applications except "Appl 1", "Web 1", "DB 1", "Web 2", and "DB2", that is to say, the instance information of "Web 2", "Appl 3", and "DB2" making up "Service C" in the above example, to the preprocessing unit 64. Note that FIG. 13 illustrates a diagram that explains an example of identifying the instance information of the application in which the abnormality has occurred.

With respect to the instance information identified by the information identifying unit 62, the first comparing unit 63 compares all the information that includes the detail information with all the information of the instance information, including the detail information, collected in the previous point, and stored in the instance-information DB 56. More specifically, the first comparing unit 63 acquires the instance information of the application that is identified, by the information identifying unit 62, as having caused the abnormality or as being affected by the abnormality, from among the instance information stored in the instance-information DB 56. Subsequent thereto, the first comparing unit 63 compares the acquired instance information with the instance information acquired from the instance-information DB 56 and collected in the previous point. Thereafter, as a result of the comparison, the first comparing unit 63 outputs the instance information determined that there is a difference, to the information sending unit 68. In the above-disclosed case, the first comparing unit 63 performs the above-disclosed comparing processing on the instance information of "Appl 1" identified as having caused the abnormality and on the instance information of "Web 1", "DB 1", "Web 2", and "DB2" identified as being affected by the abnormality.

That is to say, with respect to the instance information of the application in which the abnormality(ies) has occurred or the instance information of the application(s) affected by the abnormality(ies), the first comparing unit 63 compares the instance information including down to the detail information, such as, "starttime", "resptime", "weburl" and so on with the previously-collected instance information. With respect to the application(s) to which it is difficult to identify the details of affected abnormality(ies), the above technique allows the first comparing unit 63 to identify a portion (s) changed due to the abnormality(ies) to send the identified instance information to the data management apparatus 10.

The preprocessing unit 64 performs a variety of processing, such as, sort, deletion, and so on of the instance information before the comparison between the instance information collected by the information collecting unit 61 and the instance information collected in the previous point. More specifically, the preprocessing unit 64 performs the preprocessing on the instance information identified, by the above disclosed information identifying unit 62, as not being affected by the abnormality(ies), among the instance information collected by the information collecting unit 61. In addition, the preprocessing unit 64 performs the preprocessing on the instance information collected by the information collecting unit 61 when the information identifying unit 62 disclosed above is not included, as a unit for perform the processing, in the data collection apparatus 50. Moreover, the preprocessing unit 64 may perform the preprocessing on the instance information of the application(s) identified, by the information identifying unit 62, as having caused the abnormality(ies) or as being affected by the abnormality(ies). That is to say, the preprocessing unit 64 performs the preprocessing on the arbitrarily specified instance information.

Figure 14:
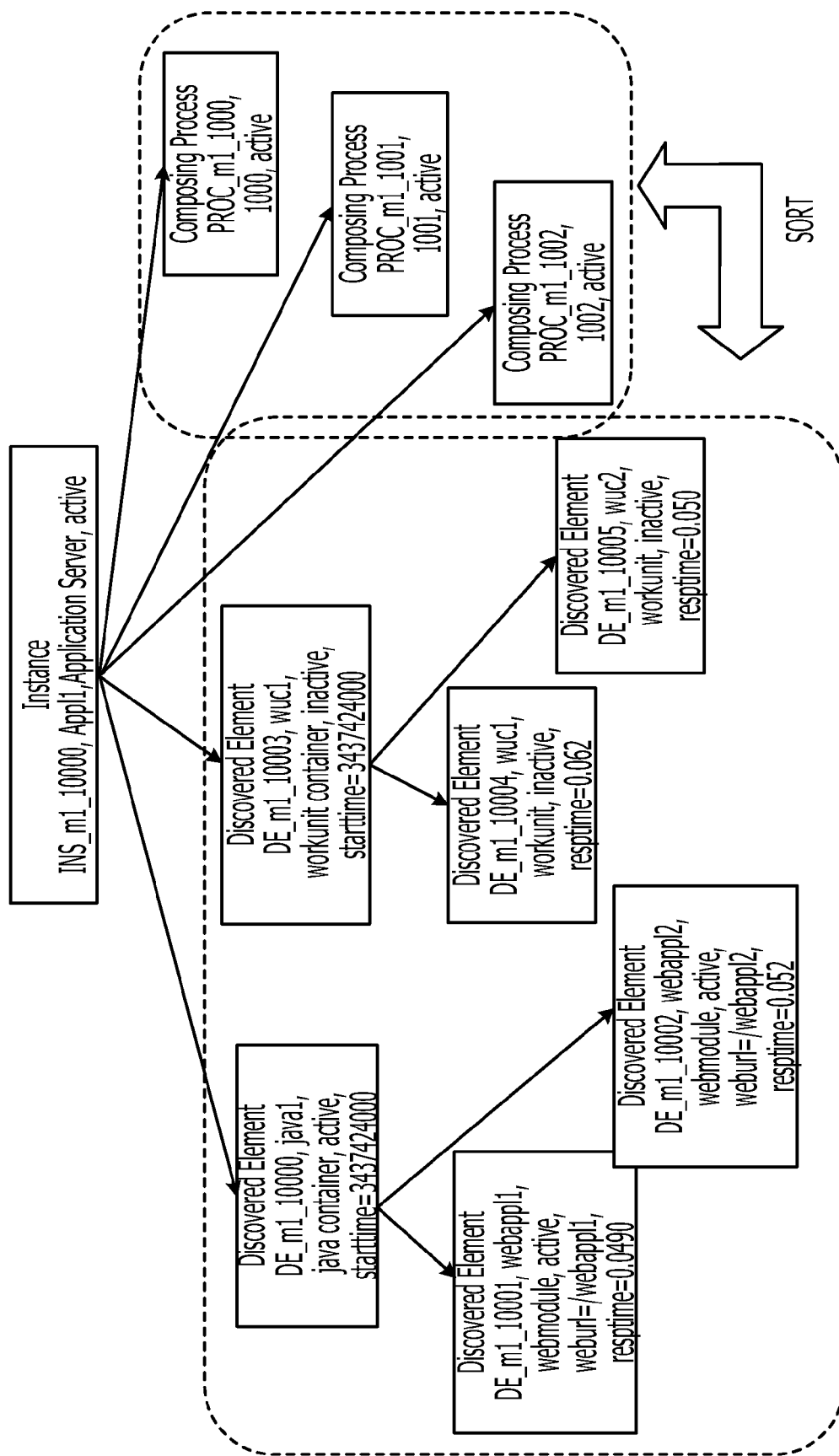
FIG. 14 illustrates a diagram that explains a sort processing as preprocessing.

Description is made with reference to the instance information illustrated in FIG. 13 as an example. Sort of the collected instance information is made by the preprocessing unit 64 such that "Discovered Element" the update frequency of which is more frequent is compared prior to "Composing Process" the update frequency of which is less frequent. For example, as illustrated in FIG. 14, as to the instance information forming the hierarchical layer, the preprocessing unit 64 sorts the instance information such that "Discovered Element" is placed on the left side and "Composing Process" is placed on the right side. The instance information placed on the left side is compared in first for the descriptive purpose. Note, however, that this order is just an example and the present application is not limited thereto.

In addition, when the instance information, which is compared as a target of comparison, includes instance information including "status=inactive", the preprocessing unit 64 deletes so-called "child" instance information of the above "parent" instance information including "status=inactive." In other words, the lower level instance information, which belong to the above instance information including "status=inactive" as its child instance information, is deleted therefrom. For example, "status" of "Discovered Element" of "Id=DE_m1__10003" is "inactive" in the instance information illustrated in FIG. 14. In the above case, as illustrated in FIG. 15, the preprocessing unit 64 deletes the "child" instance information of "Discovered Element" with "Id=DE_m1__10004" and "Discovered Element" with "Id=DE_m1__10005", the "parent" instance information of which is "Discovered Element" with "Id=DE_m1__10003." That is to say, with respect to the "parent" instance information in which "status" is "inactive", the abnormality(ies) may be sufficiently detected only by using the "parent" instance information, in other words, performing the processing on the "child"

instance information is unnecessary. Thus, the above technique allows faster comparing processing to be performed by the second comparing unit 67 disclosed later. Note that FIG. 14 is a diagram that explains the sort processing as the preprocessing, and FIG. 15 is a diagram that explains an example of the instance information deletion processing as the preprocessing.

The frequency priority unit 65 sorts the instance information collected by the information collecting unit 61 in descending order of the update frequency stored in the update frequency DB 58. More specifically, the frequency priority unit 65 sorts the instance information collected by the information collecting unit 61, the instance information identified by the information identifying unit 62, the instance information on which the preprocessing by the preprocessing unit 64 has been performed or the like in descending order of the update frequency. That is to say, the frequency priority unit 65 sorts the arbitrarily specified instance information in descending order of the update frequency.

Figure 15:
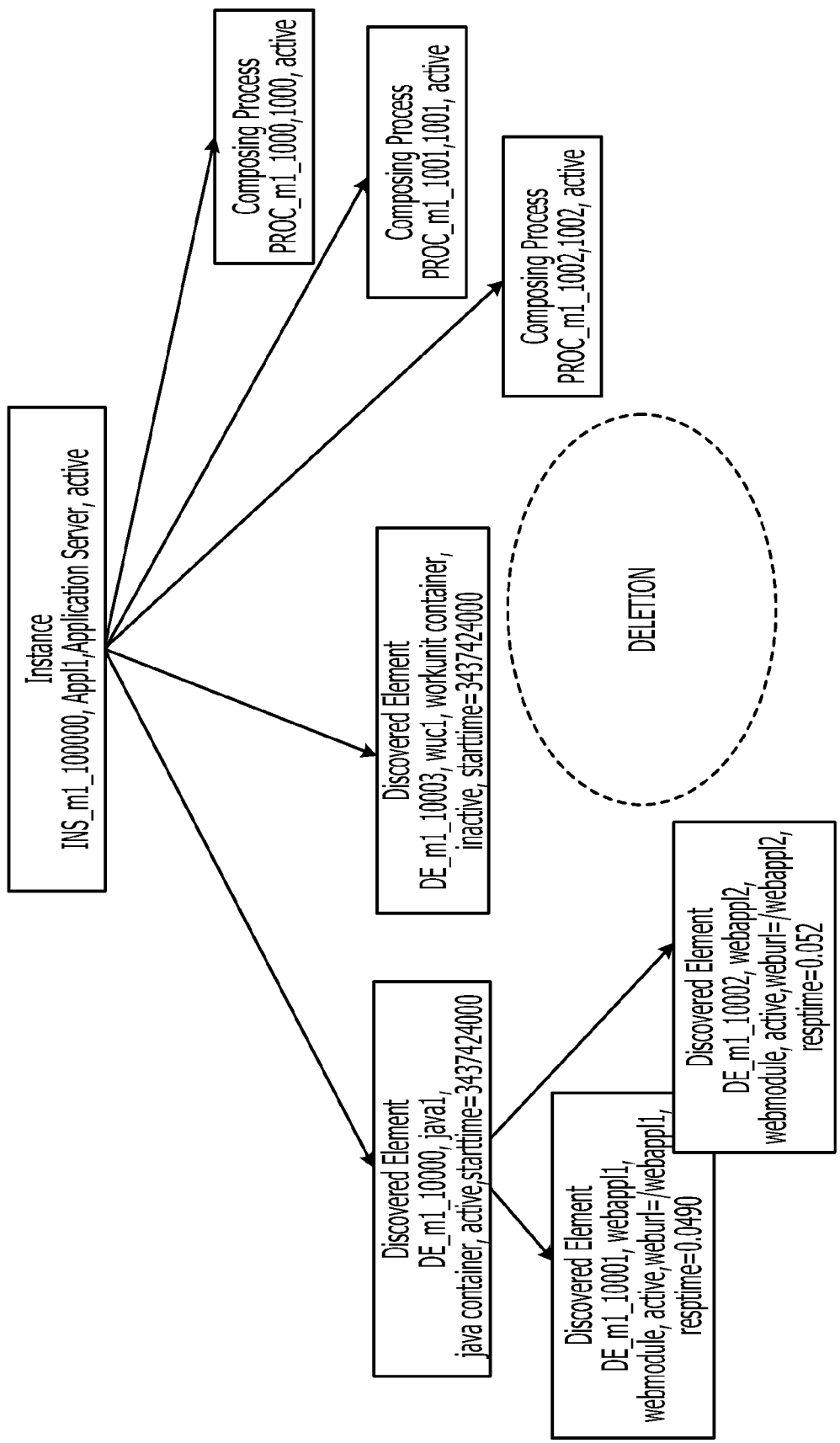
FIG. 15 illustrates a diagram that explains an example of instance information deletion processing as a preprocessing.

Description is made with reference to FIGS. 11 and 15 disclosed above. The frequency priority unit 65 references the update frequency DB 58 illustrated in FIG. 11 and acquires the number of changes of the highest level instance information that includes "Id=INS_m1_10000" illustrated in FIG. 15. Next, the frequency priority unit 65 sorts the instance information illustrated in FIG. 15 such that the instance information the update frequency of which is more frequent is compared in first with the comparing processing performed by the second comparing unit 67 disclosed later, and outputs the sorted instance information to the second comparing unit 67.

Figure 16:
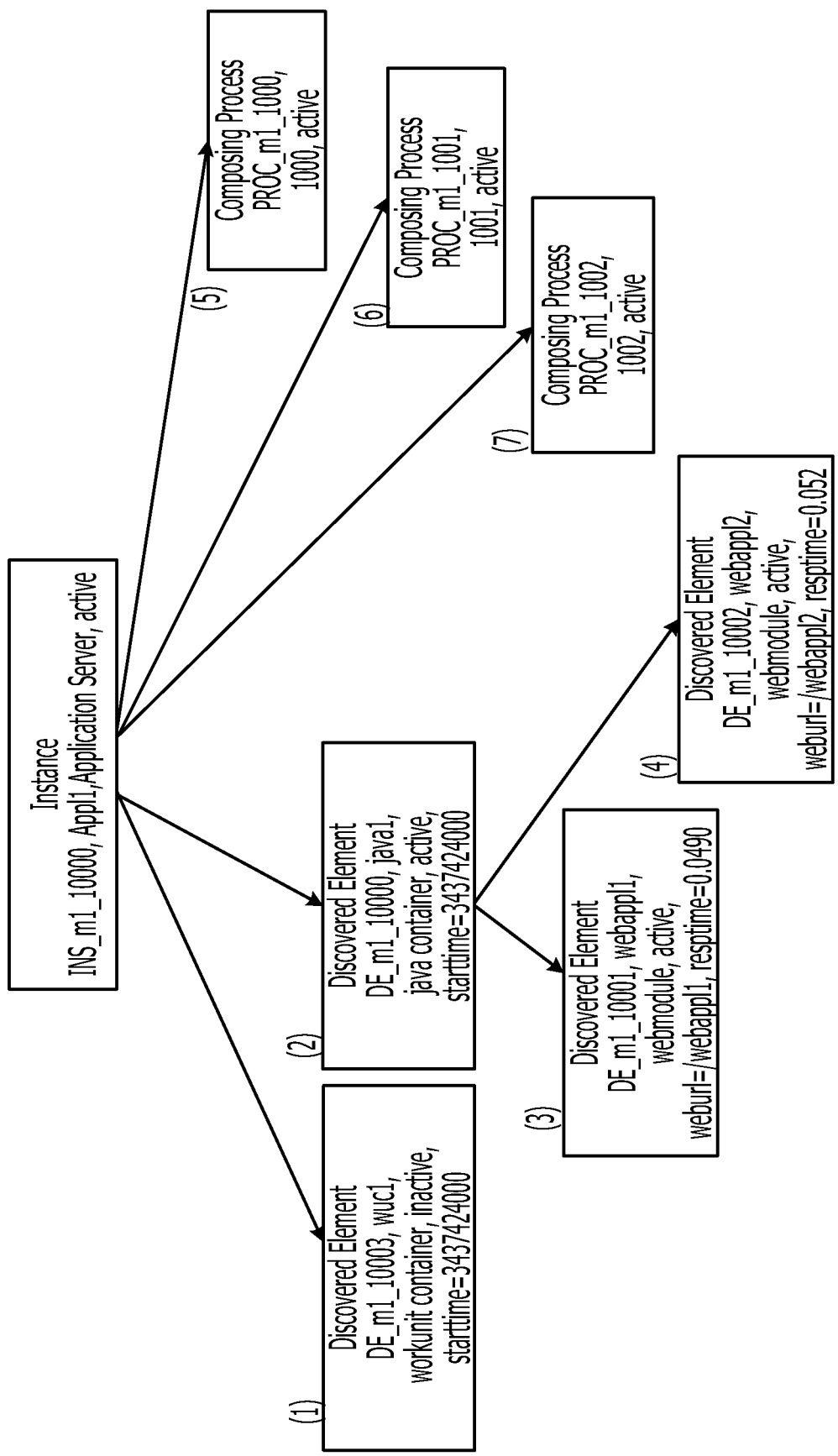
FIG. 16 illustrates a diagram that indicates an example of determining a comparison order.

More specifically, the frequency priority unit 65 references the update frequency DB 58 to acquire that the change counter of "Id=DE_m1_10003" is "3", "Id=DE_m1_10000" is "2", and "Id=DE_m1_10001" and "Id=DE_m1_10002" is "1." Next, as illustrated in FIG. 16, the frequency priority unit 65 performs the sort such that the instance the acquired update frequency of which is more frequent is compared in first to output to the second comparing unit 67. In FIG. 16, the comparing processing is performed according to the order of attached numbers. Note here that the instance placed on the left side is compared in first for the descriptive purpose. However, this is just an example, and the present application is not limited thereto. In addition, FIG. 16 illustrates a diagram that indicates an example of the determined comparison order.

The string conversion unit 66 converts the collected instance information to a string based on a certain condition. For example, information that is a target which undergoes the conversion to the string by the string conversion unit 66 may be the instance information collected by the information collection 61 or the instance information identified by the information identifying unit 62. Furthermore, it is also possible that the instance information having undergone the preprocessing by the preprocessing unit 64 or the instance information sorted by the frequency priority unit 65. That is to say, the string conversion unit 66 converts the arbitrarily specified instance information to the string based on the certain condition.

For example, the conversion to the string, by which "Id" and "status" of the respective instances are extracted, is performed on the instance information illustrated in FIG. 16 by the string conversion unit 66, in the order sorted by the frequency priority unit 65. Here, as illustrated in FIG. 17, the string conversion unit 66 generates "INS_m1_10000ACTDE_m1_10003INADE_m1_10000ACTDE_m1_10001ACTDE_m1_10002ACTPROC_m1_1000ACTPROC_m1_1001ACTPROC_m1_1002ACT" to output to the second comparing unit 67. In addition, items (information) converted to the string by the string conversion unit 66 may be arbitrarily specified by the administrators or the like, and the string conversion unit 66 performs the conversion to the string, according to the specified information as the certain condition. For example, conversion of "Id", "status", and "detail information" of the respective instances to the string is performed by the string conversion unit 66 when "Id", "status", and "detail information" is specified as the certain condition. Note that FIG. 17 is a diagram that indicates an example in which the conversion of the latest-collected instance information to the string is performed.

The second comparing unit 67 compares information converted to the string by the string conversion unit 66 with information obtained by converting the instance information, collected in the previous point and stored in the instance-information DB 56, to the string, based on the certain condition. Description is made according to the above example. With respect to the application that includes the instance information converted to the string in FIG. 17, the second comparing unit 67 acquires the instance information, collected in the previous point, from the instance-information DB 56, to convert to the string, according to the same condition as that of the string conversion unit 66.

As an example, as illustrated in FIG. 18, the second comparing unit 67 generates "INS_m1_10000ACTDE_m1_10003ACTDE m1_10004ACTDE_m1_10005ACTDE_m1_10000ACTDE_m1_10001ACTDE_m1_10002ACTPROC_m1_1000ACTPROC_m1_1001ACTPROC_m1_1002ACT." Next, the second comparing unit 67 compares the information obtained by converting the previously-collected instance information to the string in FIG. 18 with the information obtained by converting the latest-collected information to the string in FIG. 17. When there is a difference therebetween, the instance information before the conversion to the string is output to the information sending unit 68. In this example, although FIG. 17 indicates "DE_m1_10003INA", FIG. 18 indicates "DE_m1_10003ACT." Therefore, the second comparing unit 67 determines as the instance information with a difference, and the information in FIG. 13 that is the information before the conversion to the string is output to the information sending unit 68. Note that the information collecting unit 61 stores the information before converting to the string, that is to say, the collected instance information, in the storing unit 55, a memory or the like. This allows the second comparing unit 67 to identify and acquire the instance information before the conversion to the string that corresponds to the information converted to the string to send to the information sending unit 68. Note that FIG. 18 illustrates a diagram that indicates an example in which the previously-collected instance information is converted to the string.

In addition, the second comparing unit 67 may perform the comparing processing on a piece of information on which the conversion to the string has not been performed. That is to say, when received information is not the information that has not been converted to the string, in other words, the collected instance information without undergoing any change, the second comparing unit 67 makes a comparison with the instance information collected in the previous point without converting the received information to the string. For example, the second comparing unit 67 may compare a variety of instance information, such as, the instance information of the application(s) that is not identified, by the information identifying unit 62, as being affected by the abnormality(ies), information on which the preprocessing by the preprocessing unit 64 has been performed, information having been sorted by the frequency priority unit 65, and so on. That is to say, the second comparing unit 67 may perform the comparing processing in response to the status of the received information.

The information sending unit 68 sends the instance information having been determined, by the first comparing unit 63 or by the second comparing unit 67, to be different from the instance information, collected in the previous point, to the data management apparatus 10. For example, the information sending unit 68 acquires the instance information determined to be different from the instance information collected in the previous point, from among the instance information of the application(s) identified as having caused the abnormality(ies) or as being affected by the abnormality(ies), from the first comparing unit 63 to send to the data management apparatus 10. In addition, the information sending unit 68 acquires the instance information, determined to be different from the instance information collected in the previous point, among the instance information of the application(s) identified as not being affected by the abnormality(ies), from the second comparing unit 67 to send to the data management apparatus 10.

Next, processing flow by the data collection apparatus 50 disclosed in an embodiment will be disclosed with reference to FIGS. 19 through 22. Here, a processing flow by the data collection apparatus 50 and detailed processing flows each of which indicates each processing in detail will be disclosed.

Figure 19:
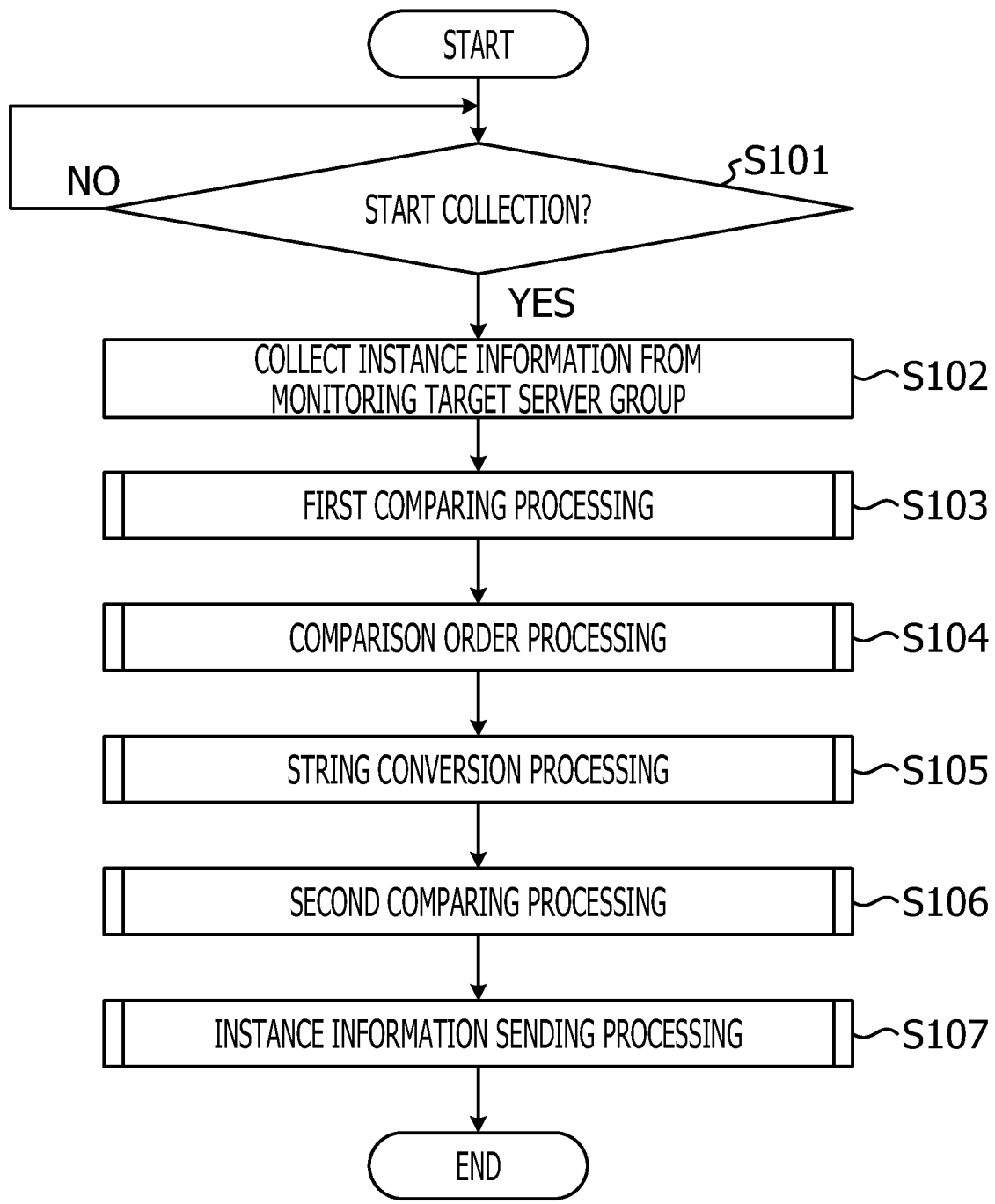
FIG. 19 illustrates a flowchart that indicates a processing flow, as a whole, by the data collection apparatus according to an embodiment.

First, a processing flow by the data collection apparatus 50 will be disclosed with reference to FIG. 19. FIG. 19 illustrates a flowchart that indicates the processing flow by the data collection apparatus according to an embodiment.

As illustrated in FIG. 19, upon reaching the point of instance information collection (Operation S101 Yes), the data collection apparatus 50 collects the instance information from the respective servers each of which is the target of monitoring (Operation S102).

Next, the data collection apparatus 50 performs a first comparing processing (Operation S103). That is to say, the data collection apparatus 50 identifies the instance information of the application(s) identified as having caused the abnormality(ies) or as being affected by the abnormality(ies), from among the collected instance information and compares the extracted instance information with the instance information collected in the previous point and extracts the instance information with the difference.

The data collection apparatus 50 having performed the first comparing processing further performs comparison order processing (Operation S104). For example, with respect to the instance information except the instance information of the application(s) identified as being affected by the abnormality(ies) with the first comparing processing, among the collected instance information, the data collection apparatus 50 performs the above-disclosed preprocessing, such as, the deletion, the sort or the like of the information.

Then, the data collection apparatus 50 performs the conversion processing to the string on the instance information having undergone the preprocessing (Operation S105). That is to say, the data collection apparatus 50 performs the conversion to the string, for example, extraction of certain information, such as "Id", "status" or the like, on the instance information having undergone the preprocessing.

Subsequent thereto, the data collection apparatus 50 performs a second comparing processing (Operation S106). For example, the data collection apparatus 50 acquires the instance information, which is collected in the previous point, among the application having the instance information converted to the string by the string conversion processing, from the instance-information DB 56 and performs the conversion to the string. Then, the data collection apparatus 50 compares the information obtained by performing the conversion of the instance information collected in the previous point to the string with the information obtained by performing the conversion of the instance information collected in the latest point to the string and extracts the instance information with the difference.

Subsequent thereto, the data collection apparatus 50 performs instance information sending processing by which the instance information, extracted by the first comparing processing or by the second comparing processing and being different from the instance information collected in the previous point, is sent to the data management apparatus 10 (Operation S 107).

Figure 20:
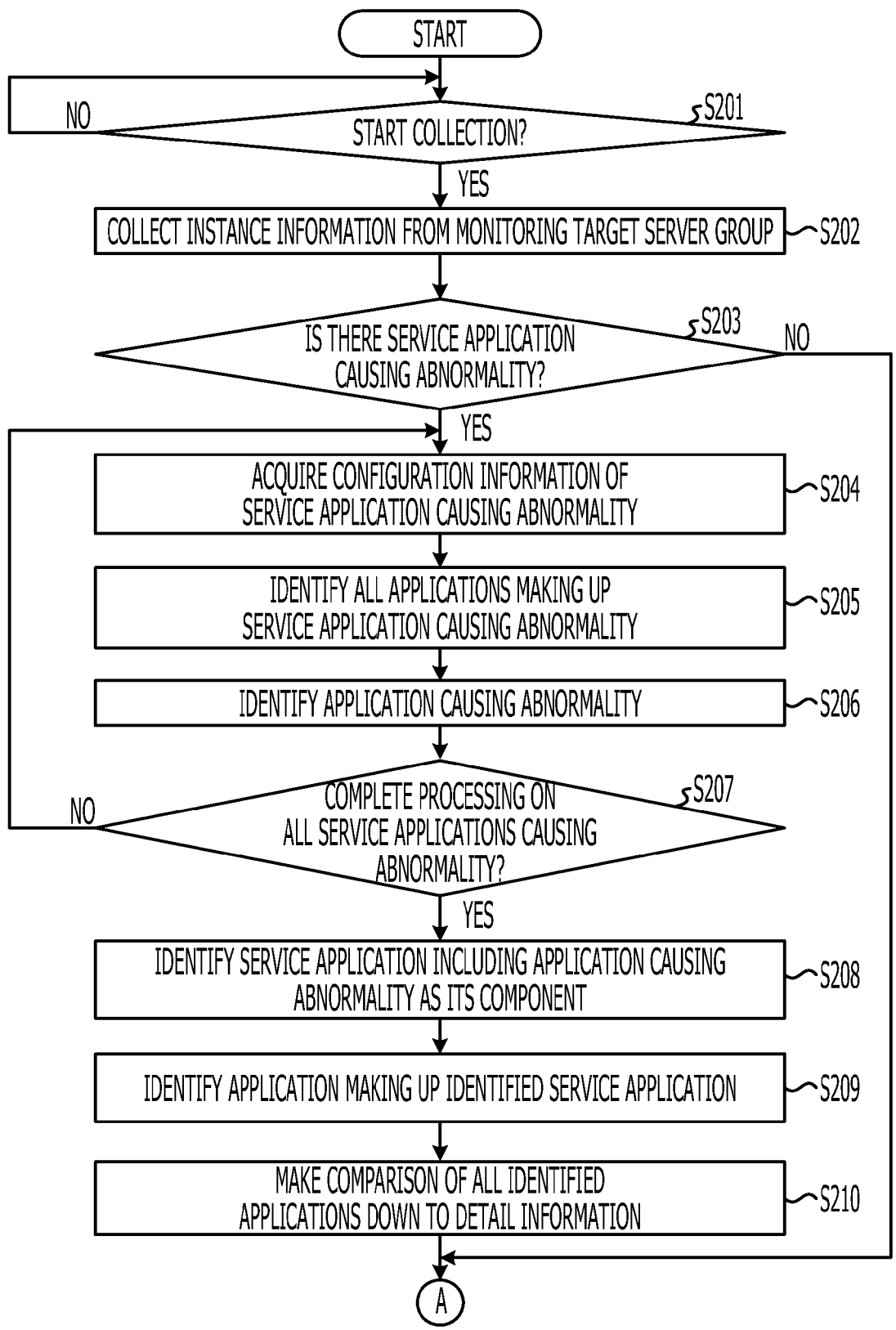
FIG. 20 illustrates a flowchart that indicates a detailed processing flow by the data collection apparatus according to an embodiment.
Figure 21:
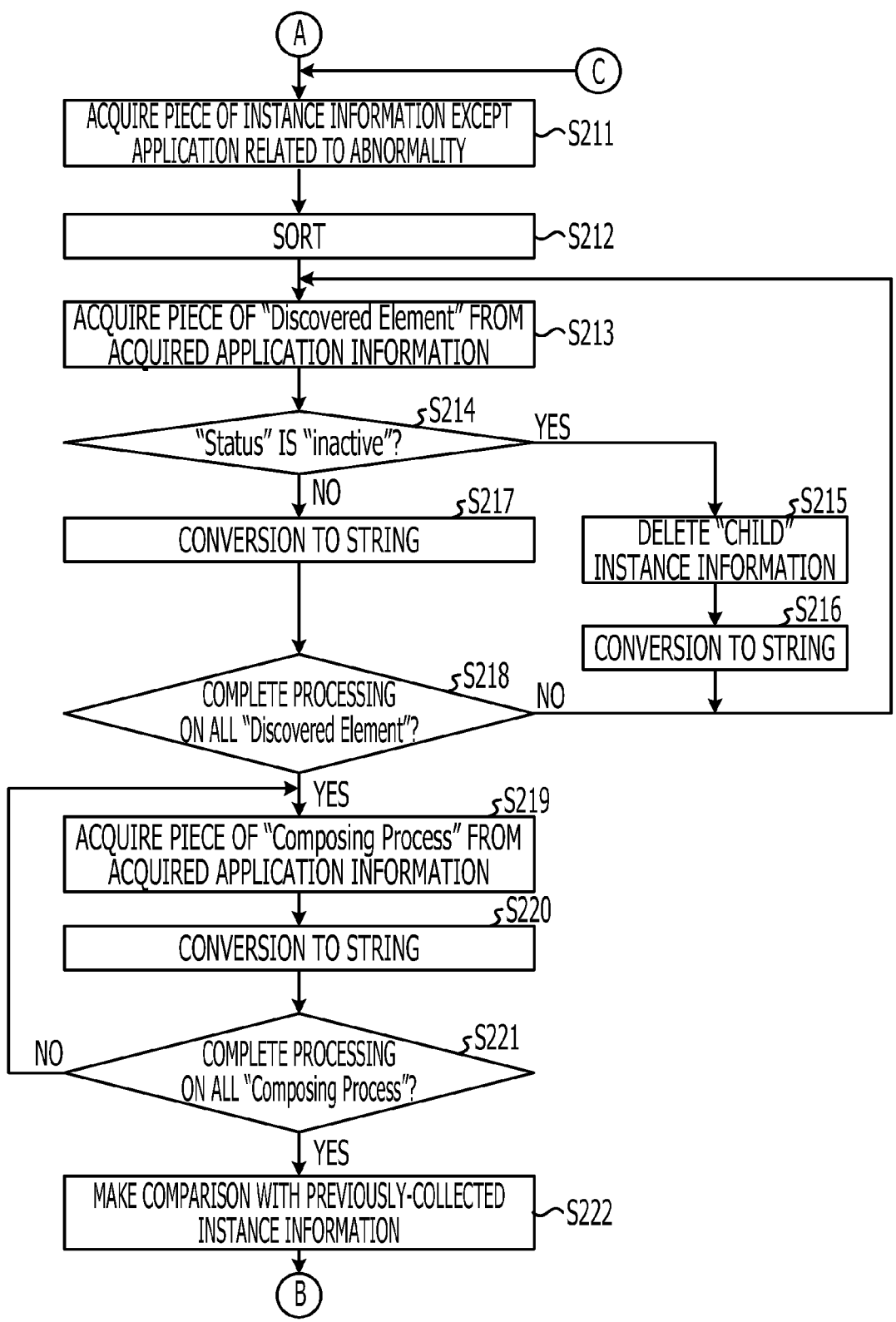
FIG. 21 illustrates a flowchart that indicates a detailed processing flow by the data collection apparatus according to an embodiment.
Figure 22:
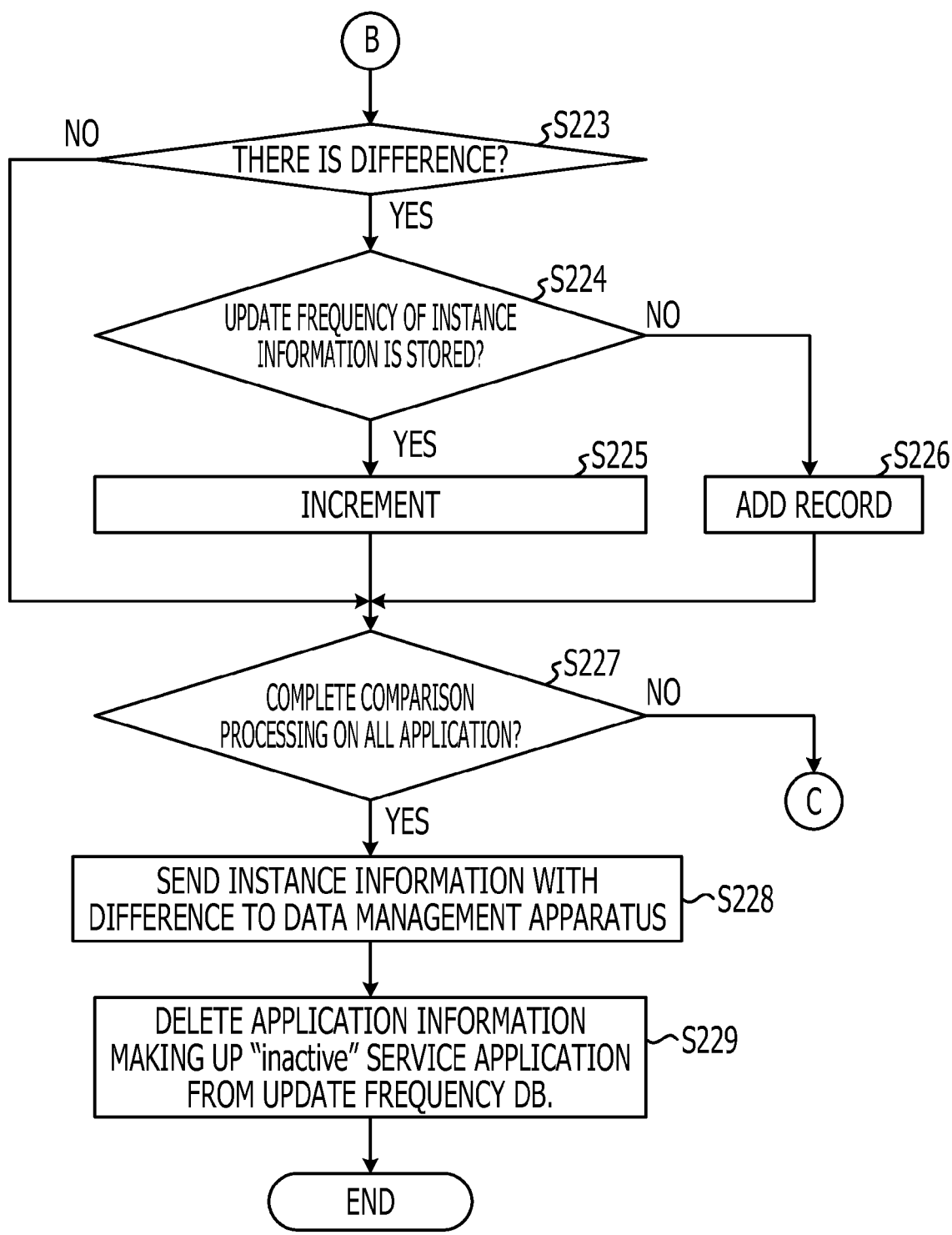
FIG. 22 illustrates a flowchart that indicates a detailed processing flow by the data collection apparatus according to an embodiment.

Next, detailed processing flow by the data collection apparatus 50 will be disclosed with reference to FIGS. 20 through 22. FIGS. 20 through 22 illustrate flowcharts that indicate detailed processing flows by the data collection apparatus according to an embodiment.

As illustrated in FIG. 20, upon reaching the point of instance information collection (Operation S201 Yes), the information collecting unit 61 of the data collection apparatus 50 collects the instance information of the application running on each server that is the target of monitoring (Operation S202).

Next, the information identifying unit 62 references the service application DB 57 and determines whether or not there is a service application(s) in which abnormality(ies) is occurring right now (Operation S203). Then, when there is a service application(s) in which the abnormality(ies) is occurring (Operation S203 Yes), the information identifying unit 62 acquires the configuration information of the service application(s) in which the abnormality(ies) is occurring, from the data management apparatus 10 (Operation S204). Note that when there is no application(s) in which the abnormality(ies) is occurring (Operation S203 No), the data collection apparatus 50 performs processing in Operation S211 disclosed later.

Subsequent thereto, the information identifying unit 62 identifies all the applications making up the service application based on the configuration information of the service application(s) in which the abnormality(ies) is occurring (Operation S205). Note that the configuration information is acquired from the data management apparatus 10. Then, the information identifying unit 62 references the instance information of the identified application based on the configuration information, from the collected instance information, and identifies the instance information, in which "status" is "inactive", as a cause of the abnormality(ies) (Operation S206). In addition, the information identifying unit 62 performs the processing of the above-disclosed Operations S204 through 206 on all the service applications in which the abnormality(ies) has occurred (Operation S207).

Thereafter, the information identifying unit 62, having identified the application(s) having caused the abnormality(ies) among all the service applications in which the abnormality(ies) has occurred, identifies the service application(s) made up of the identified application(s), as its component(s) (Operation S207 Yes and Operation S208). That is to say, the information identifying unit 62 references the configuration information acquired from the data management apparatus 10 and identifies the service application that includes the application(s), having caused the abnormality(ies), as its component(s).

Subsequent thereto, the information identifying unit 62 references the configuration information acquired form the data management apparatus 10 and identifies the application(s) that makes up the identified service application(s) in Operation S208 (Operation S209). Then, with respect to the application(s) identified by the information identifying unit 62, the first comparing unit 63 compares all the information that includes the detail information with all the information that includes the detail information stored in the instance-information DB 56 and collected in the previous point (Operation S210).

Subsequent thereto, as illustrated in FIG. 21, the preprocessing unit 64 acquires the instance information of the application(s) that has not been identified by the information identifying unit 62, from the collected instance information (Operation S211). In other words, the preprocessing unit 64 acquires the instance information of the application(s) except the application(s) related to the abnormality(ies).

Thereafter, the preprocessing unit 64 sorts the collected instance information such that the instance(s) the update frequency of which is more frequent is compared prior to the instance(s) the update frequency of which is less frequent (Operation S212). Here, the frequency priority unit 65 may sort the instance information in descending order of the update frequency stored in the update frequency DB 58.

Subsequent thereto, the preprocessing unit 64 acquires a piece of the instance information of "Discovered Element" from the pieces of sorted instance information (Operation S213) and determines whether or not "status" is "inactive" (Operation S214).

Then, when the preprocessing unit 64 determines that "status" is "inactive" (Operation S214), the preprocessing unit 64 deletes the "child" instance information of "Discovered Element" (Operation S215). Subsequent thereto, the preprocessing unit 64 executes processing in Operation S213 after converting (Operation S216) the instance information of "Discovered Element", in which "status" is "inactive", to the string, according to the certain condition.

On the other hand, when the preprocessing unit 64 determines that "status" is not "inactive" (Operation S214 No), the preprocessing unit 64 converts the instance information of "Discovered Element" to the string, according to the certain condition (Operation S217). Then, the string conversion unit 66 repeatedly performs the above disclosed Operations from S213 through S217 on "Discovered Element" of the instance information of the application(s) except the application(s) that is related to the abnormality(ies) (Operation S218).

Upon completion of the conversion of all "Discovered Element" to the string by the preprocessing unit 64 (Operation S218 Yes), the string conversion unit 66 acquire a piece of instance information of "Composing Process" among the pieces of sorted instance information (Operation S219). Subsequent thereto, the string conversion unit 66 converts the instance information of the acquired "Composing Process" to the string, according to the certain condition (Operation S220). Then, the string conversion unit 66 repeatedly performs the above Operations from S219 to S220 on "Composing Process" of the instance information of the application(s) except the application(s) related to the abnormality(ies) (Operation S221).

Thereafter, upon completion of the conversion of "Discovered Element" and "Composing Process" of the instance information of the application(s) except the application(s) related to the abnormality(ies) to the string (Operation S221 Yes), the second comparing unit 67 performs the comparing processing (Operation S222). That is to say, the second comparing unit 67 compares the information converted to the string by the string conversion unit 66 with the information obtained by converting the instance information, stored in the instance-information DB 56 and collected in the previous point, to the string, according to the certain condition.

Then, as illustrated in FIG. 22, as a result of the comparison, when the second comparing unit 67 determines there is a difference therebetween (Operation S223 Yes), the second comparing unit 67 determines whether or not the update frequency of the instance information is stored in the frequency update DB 58 (Operation S224). Note that when the second comparing unit 67 determines there is no difference therebetween (Operation S223 No), the second comparing unit 67 performs Operation S227 hereinafter disclosed.

When an update frequency of the instance information indicating the difference is stored (Operation S224 Yes), the second comparing unit 67 increments the update frequency (Operation S225). On the other hand, when the update frequency of the instance information indicating the difference has not been stored (Operation S224 No), the second comparing unit 67 creates a new record that indicates the update frequency of the instance information (Operation S226).

Then, the data collection apparatus 50 performs the processing of Operations from S211 to S226 on the instance information of the application(s) determined as not being affected by the abnormality(ies) among the instance information collected by the information collecting unit 61 (Operation S 227). That is to say, the data collection apparatus 50 returns to Operation S211 and performs the subsequent processing when there is instance information that remains unprocessed (Operation S227 No).

Subsequent thereto, in response to the performance of the above-disclosed comparison is performed on all the instance information collected by the information collecting unit 61 (Operation S227 Yes), the information sending unit 68 sends the instance information, which is determined to be different, to the data management apparatus 10 (Operation S 228).

In addition, in the example of the above-disclosed processing, the processing of Operations from S211 to S227 does not include the instance information of the application(s) making up the service application in which "status" is "Down." Thus, storing the instance information, in which "status" is "inactive", in the update frequency DB 58 is unnecessary. For this reason, the frequency priority unit 65 deletes the information of the application(s) making up the service application(s), in which "status" is "Down", from the update frequency DB 58 (Operation S229).

In this way, the data collection apparatus 50 performs each of the two pieces of comparing processing, that is, the comparing processing in which the detail information is included and the comparing processing in which the detail information is not included, and detects the application information that is different from the application information collected in the previous point, according to an embodiment. In consequence, the data collection apparatus 50 may achieve faster comparing processing of all the collected applications as compared to the case where comparison down to the detail information is made. As a result thereof, it is possible to achieve the faster comparing processing of the application information in the data collection processing, so that occurrence of the processing delay may be reduced, if not prevented.

Furthermore, since the processing delay does not occur in spite of the increase in number of servers that are the target of monitoring, the instance information almost real-time may be achieved, according to an embodiment. Moreover, the data management apparatus 10 may acquire only the instance information of the application(s) for which the detail information is necessary. In addition, when the abnormality(ies) has occurred in the application(s), the underlying cause(s) thereof may by identified by checking the detail information of the application(s). Moreover, when the abnormality (ies) has occurred in the application(s), a list of the service application(s) unable to use due to the abnormality(ies) may be created.

The embodiments of the present invention are disclosed hereinabove. Note, however, that the present invention may be achieved by using a variety of modifications other than the embodiments disclosed hereinabove. Hereinafter, another embodiment will be disclosed.

For example, the order of each processing disclosed in the above second embodiment may be arbitrarily specified and each processing may also be independently executed. More specifically, the order of the each processing performed on the instance information collected by the information collecting unit 61 is not limited to the order disclosed in an embodiment. The order may be arbitrarily specified. In addition, the processing performed on the instance information, collected by the information collecting unit 61, is not necessarily to be combined together as disclosed in an embodiment in which a plurality of pieces of processing is combined together. For example, the number of pieces of processing performed thereon, such as, the processing of conversion to the string, the comparing processing or the like, may be arbitrarily specified.

For example, each of the following processing, that is, the comparison down to the detail information with respect to the applications affected by the abnormality(ies), the comparison through the conversion to the string, the comparison based on the sort in descending order of the update frequency, the comparison of only specified information among the instance information may be separately performed. Moreover, each of processing as disclosed above may be arbitrarily combined and executed.

Furthermore, a part or all of the processing disclosed as being automatically performed, among the processing disclosed in the present embodiments may be manually performed. Alternatively, a part or all of the processing disclosed as being manually performed may be automatically performed. Yet alternatively, the processing procedures, control procedures, specific names disclosed in the specification and drawings, for example, information that includes the variety of data and parameters indicated in FIGS. 3 through 6, FIGS. 9 through 17 or the like may be arbitrarily modified unless otherwise mentioned.

Moreover, each of the structural elements of each of the apparatuses/units illustrated herein is just functional and/or conceptual perspectives. Therefore, it does not mean that each of the structural elements of each of the apparatuses/ units is physically formed as illustrated in the above disclosed drawings. That is to say, the specific configurations of distributing and integrating the respective apparatuses/units, for example, integration of the information identifying unit 62 and the first comparing unit 63 or the like, are not limited to the examples illustrated in the above-disclosed drawings. A part or all thereof the respective apparatuses/units may be functionally and/or physically distributed or integrated in an arbitrary unit depending on a variety of loads, the status of use thereof or the like. In addition, an arbitrary part or all of the respective processing functions performed by the respective apparatus/units may be achieved by a CPU and a program analyzed and executed by the CPU or may be achieved, as hardware, with a certain wired logic.

By the way, the variety of processing disclosed in the above embodiments may be achieved by running a program that is prepared in advance on a computer system, such as, a personal computer, a work station or the like. Hereinafter, one example of a computer system that executes a program that includes the same or similar functions as those disclosed in the above embodiments.

Figure 23:
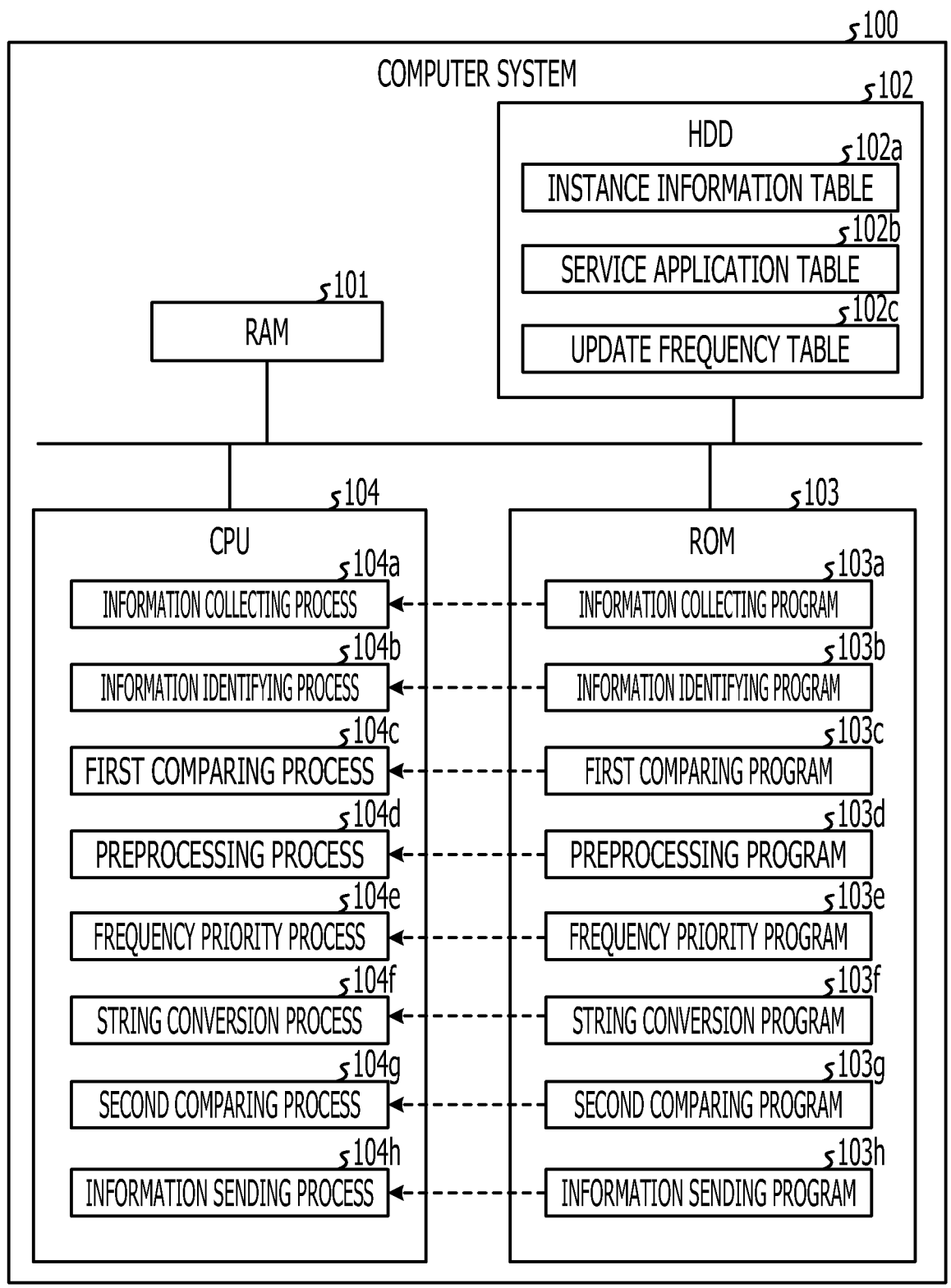
FIG. 23 illustrates a diagram that indicates a computer system executing a data collection program.
Figure 24:
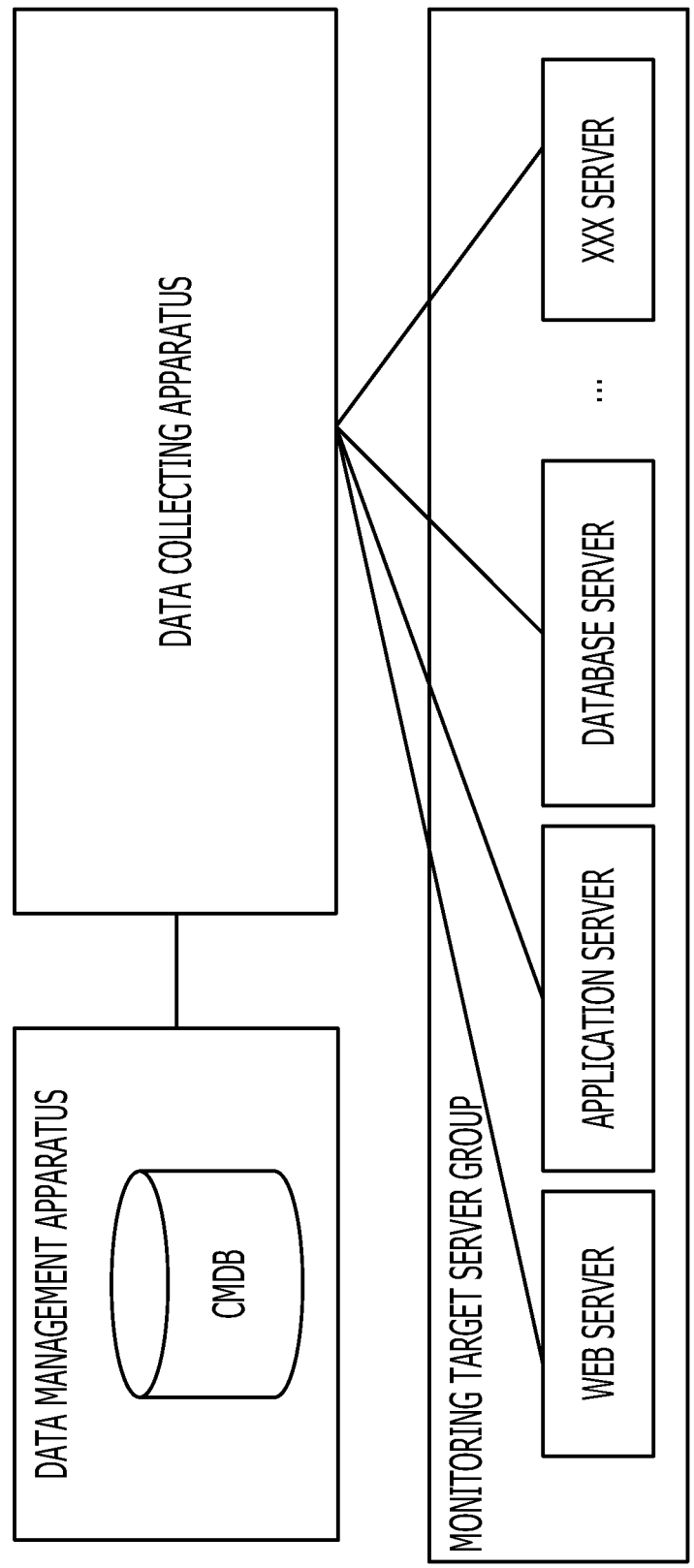
FIG. 24 illustrates a diagram that explains a related technique.

FIG. 23 illustrates a diagram that indicates a computer system 100 that executes a data collection program. As illustrated in FIG. 23, the computer system 100 includes a RAM 101, an HDD 102, a ROM 103, and a CPU 104. Here, the Rom 103 stores, in advance, a program that executes the same or similar functions as those disclosed in the above embodiments. That is to say, as illustrated in FIG. 23, the Rom 103 stores an information collecting program 103a, an information identifying program 103b, a first comparing program 103c, a preprocessing program 103d, and a frequency priority program 103e therein, in advance. Furthermore, the ROM 103 stores a string conversion program 103f, a second comparing program 103g, and an information sending program 103h therein, in advance.

The CPU 104 reads these programs 103a through 103h to execute, so that respective processes illustrated in FIG. 23 may be achieved. That is to say, the information collecting process 104a, the information identifying process 104b, the fest comparing process 104c, the preprocessing process 104d, the frequency priority process 104e, the string conversion process 104f, the second comparing process 104g, and the information sending process 104h may be achieved. Note that the information collecting process 104a corresponds to the information collecting unit 61 illustrated in FIG. 8. In the same manner, the information identifying process 104b corresponds to the information identifying unit 62. The first comparing process 104c corresponds to the first comparing unit 63. The preprocessing process 104d corresponds to the preprocessing unit 64. Furthermore, the frequency priority process 104e corresponds to the frequency priority unit 65. The string conversion process 104f corresponds to the string conversion unit 66. The second comparing process 104g corresponds to the second comparing unit 67. The information sending process 104h corresponds to the information sending unit 68.

Moreover, the HDD 102 includes an instance information table 102a, a service application table 102b, and an update frequency table 102c. The instance information table 102a corresponds to the instance-information DB 56 illustrated in FIG. 8. In the same manner, the service application table 102b corresponds to the service application DB 57, and the update frequency table 102c corresponds to the update frequency DB 58.

By the way, the above-disclosed programs 102a through 103g are not necessarily stored in the ROM 103. For example, the above-disclosed programs may be stored in storage media, for example, a flexible disc (FD), a CD-ROM, a DVD-disc, a magnet-optical disc, and an IC card or the like, all of which are loaded into the computer system 100. In addition, the above-disclosed programs may be stored in storage media, such as, a hard disc drive (HDD) or the like, provided inside/outside the computer system 100. Moreover, the above-disclosed programs may be stored in storage media disposed in "the other computer system" coupled through a public transmission line, the Internet, a LAN, a WAN, and so on, to the computer system 100. In the above case, the computer system 100 may read the programs from the storage media disposed in the other computer system to execute.

That is to say, the programs according to "another embodiment" are the programs which are readably stored in the storage media disclosed above. The computer system 100 reads the programs from the above-disclosed storage media to execute, so that the functions same as or similar to those disclosed in the above embodiments may be achieved. Note that the programs disclosed in "another embodiment" are not limited to programs that are executed only by the computer system 100. For example, the present invention may be applicable to cases where the other computer system(s) or a server (s) execute the programs and cases where these structural elements execute the programs in association with each other.

According to the embodiments disclosed above, the faster comparing processing of the application information in the data collection processing may be achieved, so that the occurrence of the processing delay may be effectively reduced, if not prevented.

As mentioned above, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention, the scope of which is defined in the claims and their equivalents.

What is claimed is:

1. A data collection apparatus, comprising:
 a storage configured to store application information collected from a server providing a service by running an application and includes detail information indicating a detail of the application and an update frequency which indicates a number of past updates of the application information;
 a processor coupled to the storage, the processor being configured to execute an operation including:
  collecting the application information from the server;
  identifying application information of an application in which an abnormality has occurred and application information affected by the abnormality and identifying application information other than data associated with the abnormality, from among the application information collected;
  sorting the application information collected, in order of the update frequency stored;
  converting the application information, collected, to a string, according to a certain condition;
  comparing, in the order determined in accordance with the sorting, all converted information including the detail information with all information of the application information, including the detail information collected in a previous point and stored, and extracting application information different from the application information collected in the previous point as a result of the comparing;
  excluding, from the application information other than data associated with the abnormality, information including the detail information of the application information;
  executing a subsequent comparing using a result of the excluding, and extracting application information different from the application information collected in the previous point as a result of the subsequent comparing; and
  sending the application information, extracted by one of the comparing and the subsequent comparing, to a data management apparatus which manages the application information.

2. The data collection apparatus according to claim 1, wherein
 the application information collected is sorted in descending order of the update frequency stored.

3. A non-transitory computer readable recording medium storing a data collection program that causes a computer to execute an operation, comprising:
 collecting application information, which includes detail information indicating a detail of an application, from a server which provides a service by running the application;
 identifying application information associated with an abnormality and application information other than data associated with the abnormality;
 converting the application information, collected by the collecting, to a string, according to a certain condition;
 sorting the application information collected, in order of an update frequency;
 comparing, in the order determined by the sorting, information which is converted to the string with information which is obtained by converting the application information, collected in a previous point and stored application information having been previously collected, to the string, according to the certain condition, and extracting application information different from the application information collected in the previous point, the comparing including a subsequent comparing that excludes, from the application information other than the data associated with the abnormality, information including detail information of the application information to obtain a result of the subsequent comparing; and
 sending the application information, extracted by the comparing and the subsequent comparing, to a data management apparatus which manages the application information.

4. A data collection method that causes a computer to execute an operation, comprising:
 collecting application information, which includes detail information indicating a detail of an application, from a server which provides a service by running the application;

identifying application information of an application in which an abnormality has occurred and application information affected by the abnormality and identifying application information other than data associated with the abnormality, from among the application information collected by the collecting;

sorting the application information collected, in an order of an update frequency;

converting the application information, collected, to a string, according to a certain condition;

comparing, in the order of the update frequency, converted information including the detail information with all information of the application information, including the detail information, collected in a previous point, and stored application information having been previously collected, and extracting application information different from the application information collected in the previous point as a result of the comparing;

excluding, from the application information other than data associated with the abnormality, information including the detail information of the application information;

executing a subsequent comparing using a result of the excluding, and extracting application information different from the application information collected in the previous point as a result of the subsequent comparing; and sending the application information, extracted by one of the comparing and the subsequent comparing, to a data management apparatus which manages the application information.

5. The data collection apparatus according to claim 1, wherein a first difference between the application information identified and the application information collected in the previous point is obtained, and the subsequent comparing includes extracting a second difference between the application information identified and the application information collected in the previous point; and the first difference and the second difference are sent to the data management apparatus.

6. The non-transitory computer readable recording medium according to claim 3, wherein a first difference between the application information identified and the application information collected in the previous point is obtained, and the subsequent comparing includes extracting a second difference between the application information identified and the application information collected in the previous point; and the first difference and the second difference are sent to the data management apparatus.

7. The data collection method according to claim 4, wherein a first difference between the application information identified and the application information collected in the previous point is obtained, and the subsequent comparing includes extracting a second difference between the application information identified and the application information collected in the previous point; and the first difference and the second difference are sent to the data management apparatus.

8. The non-transitory computer readable recording medium according to claim 3, wherein update frequency data which indicates a number of past updates of application information is stored, and the update frequency data is sorted in descending order according to an update frequency.

9. The data collection method according to claim 4, wherein update frequency data which indicates a number of past updates of application information is stored, and the update frequency data is sorted in descending order according to an update frequency.

* * * * *